United States Patent
Lee et al.

(10) Patent No.: US 9,451,267 B2
(45) Date of Patent: *Sep. 20, 2016

(54) METHODS AND APPARATUSES FOR ENCODING AND DECODING MOTION VECTOR

(71) Applicant: SAMSUNG ELECTRONICS CO., LTD., Suwon-si (KR)

(72) Inventors: Tammy Lee, Seoul (KR); Vadim Seregin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,165

(22) Filed: Feb. 5, 2015

(65) Prior Publication Data

US 2015/0156496 A1    Jun. 4, 2015

Related U.S. Application Data

(63) Continuation of application No. 13/179,758, filed on Jul. 11, 2011.

(60) Provisional application No. 61/362,809, filed on Jul. 9, 2010.

(30) Foreign Application Priority Data

Mar. 3, 2011    (KR) .................. 10-2011-0019100

(51) Int. Cl.
  *H04N 19/139*    (2014.01)
  *H04N 19/52*    (2014.01)
  (Continued)

(52) U.S. Cl.
  CPC .......... *H04N 19/139* (2014.11); *H04N 19/105* (2014.11); *H04N 19/119* (2014.11);
  (Continued)

(58) Field of Classification Search
  CPC .................................. H04N 19/139
  See application file for complete search history.

(56) References Cited

U.S. PATENT DOCUMENTS

| | | |
|---|---|---|
| 5,614,954 A | 3/1997 | Jung |
| 6,332,002 B1 | 12/2001 | Lim |

(Continued)

FOREIGN PATENT DOCUMENTS

| | | |
|---|---|---|
| CN | 1136732 C | 1/2004 |
| CN | 1882089 A | 12/2006 |

(Continued)

OTHER PUBLICATIONS

Communication from the State Intellectual Property Office of P.R. China dated Aug. 25, 2015 in a counterpart Chinese application No. 201180043464.5.

(Continued)

*Primary Examiner* — Tung Vo
*Assistant Examiner* — Rowina Cattungal
(74) *Attorney, Agent, or Firm* — Sughrue Mion, PLLC

(57) ABSTRACT

Encoding and decoding a motion vector using a motion vector of a current block of a current picture, which indicates a region corresponding to the current block in a first reference picture and one of generating a motion vector predictor from a motion vector of the adjacent block having a motion vector referring to the first reference picture among adjacent blocks encoded before the current block and a motion vector of an adjacent block referring to a second reference picture other than the first reference picture.

1 Claim, 21 Drawing Sheets

(51) Int. Cl.
H04N 19/119 (2014.01)
H04N 19/176 (2014.01)
H04N 19/513 (2014.01)
H04N 19/56 (2014.01)
H04N 19/105 (2014.01)
H04N 19/159 (2014.01)
H04N 19/129 (2014.01)

(52) U.S. Cl.
CPC .......... *H04N19/129* (2014.11); *H04N 19/159* (2014.11); *H04N 19/176* (2014.11); *H04N 19/513* (2014.11); *H04N 19/52* (2014.11); *H04N 19/56* (2014.11)

(56) References Cited

U.S. PATENT DOCUMENTS

| | | | | |
|---|---|---|---|---|
| 7,386,048 | B2* | 6/2008 | Sun | H04N 19/197 375/240.15 |
| 7,394,853 | B2 | 7/2008 | Kondo et al. | |
| 8,155,193 | B2* | 4/2012 | Kato | H04N 19/172 375/240.16 |
| 9,031,132 | B2 | 5/2015 | Kondo et al. | |
| 9,137,546 | B2 | 9/2015 | Won et al. | |
| 2004/0218674 | A1 | 11/2004 | Kondo et al. | |
| 2005/0117646 | A1 | 6/2005 | Joch et al. | |
| 2006/0018381 | A1* | 1/2006 | Luo | H04N 5/145 375/240.16 |
| 2008/0043843 | A1* | 2/2008 | Nakaishi | H04N 19/176 375/240.16 |
| 2008/0310745 | A1* | 12/2008 | Ye | H04N 19/61 382/238 |
| 2011/0090964 | A1* | 4/2011 | Xu | H04N 5/144 375/240.16 |
| 2013/0294517 | A1 | 11/2013 | Fujibayashi et al. | |
| 2015/0030077 | A1 | 1/2015 | Jeon et al. | |
| 2015/0063458 | A1 | 3/2015 | Kondo et al. | |
| 2015/0110194 | A1 | 4/2015 | Kato et al. | |
| 2015/0288981 | A1 | 10/2015 | Kim et al. | |

FOREIGN PATENT DOCUMENTS

| | | | |
|---|---|---|---|
| EP | 0651582 | A2 | 10/1994 |
| JP | 2000-252058 | A | 9/2000 |
| JP | 2004-56756 | A | 2/2004 |
| JP | 2004-72712 | A | 3/2004 |
| JP | 2004-96705 | A | 3/2004 |
| JP | 2004-336369 | A | 11/2004 |
| JP | 2013-526142 | A | 6/2013 |
| KR | 19960036771 | A | 10/1996 |
| KR | 19990038003 | A | 6/1999 |
| KR | 2003-0049454 | A | 6/2003 |
| KR | 10-2010-0041393 | A | 4/2010 |
| KR | 10-2010-0048435 | A | 5/2010 |
| WO | 2009/051419 | A2 | 4/2009 |
| WO | 2011/131089 | A | 10/2011 |
| WO | 2012/093585 | A1 | 9/2015 |

OTHER PUBLICATIONS

Communication from the European Patent Office issued Aug. 25, 2015 in a counterpart European Application No. 15167258.1.
Laroche G, et al., "RD Optimized Coding for Motion Vector Predictor Selection", IEEE Transactions on Circuits and Systems for Video Technology, IEEE Service Center, Piscataway, NJ, US, vol. 18, No. 9, Sep. 1, 2008, pp. 1247-1257, XP011231739.
Communication from the Japanese Patent Office dated Sep. 29, 2015 in a counterpart Japanese application No. 2013-519576.
Akira Fujibayashi, et al., "CE9 3.2d Simplified Motion vector prediction", JCTVC-D231, Joint Collaborative Team on Video Coding (JCT-VC) of ITU-T SG16 WP3 and ISO/IEC JTC1/SC29/WG11, 4th Meeting: Daegu, Korea, Jan. 20-28, 2011, total 6 pages.
Frank Bossen, et al., "Simplified motion vector coding method", JCTVC-B094, Joint Collaborative Team on Video Coding (JCT-VC) of ITU-T SG16 WP3 and ISO/IEC JTC1/SC29/WG11, 2nd Meeting: Geneva, CH, Jul. 21-28, 2010, total 6 pages.
Communication dated Jun. 10, 2015 issued by European Patent Office in counterpart European Application No. 11803835.5.
McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, Apr. 15-23, 2010, 42 pages total, Dresden, DE, JCTVC-A124.
McCann, Han, Kim, "Samsung's Response to the Call for Proposals on Video Compression Technology", Joint Collaborative Team on Video Coding (JCT-VC) of ITU-T SG16 WP3 and ISO/IEC JTC1/SC29/WG11, Apr. 15-23 2010, 13 pages total, Dresden, DE, JCTVC-A124.
McCann, Han, Kim, Min, Alshina, Alshin, Lee, Chen, Seregin, Lee, Hong, Cheon, Shylakhov., Video coding technology proposal by Samsung (and BBC)—presentation Slides ("Samsung and BBC response to Calls for Proposals on Video Compression Technology"), Joint Collaborative Team on Video Coding of ISO/IEC JTC1/SC29/WG11 and ITU-TSG.16, Apr. 15-23, 2010, 36 pages total, JCTVC-A124.
Samsung & BBC, "Video coding technology proposal by Samsung (and BBC)—Software-File TCommData CU.cpp" Joint Collaborative Team on Video Coding of ISO/IEC JTC1/SC29/WG11 and ITU-TSG.16, Apr. 15-23, 2010, 82 pages total, XP055193495.
Communication dated May 12, 2015 issued by Japanese Intellectual Property Office in counterpart Japanese Application No. 2013-519576.
"Test Model under Consideration", Joint Collaborative Team on Video Coding (JCT-VC) of ITU-T SG16 WP3 and ISO/IEC JTC1/SC29/WG11, Apr. 15-23, 2010, 36 pages total, Dresden, DE, JCTVC-A205.
Davies et al., "Suggestion for a Test Model", Joint Collaborative Team on Video Coding (JCT-VC) of ITU-T SG16 WP3 and ISO/IEC JTC1/SC29/WG11, Apr. 15-23, 2010, 12 pages total, Dresden, DE, JCTVC-A033.
International Search Report (PCT/ISA/210) issued on Feb. 22, 2012 in the International Patent Application No. PCT/KR2011/005032.
Karczewicz, M. et. al. "Video coding technology proposal by qualcomm Inc." Joint Collaborative Team on Video Coding (JCT-VC) of ITU-T SG16 WP3 and ISO/IEC JTC1/SC29/VVG11, 1st Meeting, Apr. 15-23, 2010, pp. 1-24.
Communication dated Apr. 17, 2014 issued by the Korean Intellectual Property Office in counterpart Korean Patent Application No. 10-2011-0019100.
Communication dated Dec. 26, 2014 issued by the Korean Intellectual Property Office in counterpart Korean Patent Application No. 10-2014-0073679.
Communication dated Dec. 3, 2014 issued by the Philippine Intellectual Property Office in counterpart Philippine Patent Application No. PH 1-2013-500059.
Thomas Davies, "BBC's Response to the Call for Proposals on Video Compression Technology", Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A125, (13 Pages Total).
Jian-Liang Lin et al., "Improved Advanced Motion Vector Prediction", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D125, (9 Pages Total).
Communication dated Mar. 8, 2016, from the State Intellectual Property Office of People's Republic of China in counterpart Application No. 201510195305.7.
Communication dated Feb. 23, 2016, from the Japanese Patent Office in counterpart application No. 2013-519576.
Communication dated Dec. 23, 2015, issued by the Korean Intellectual Property Office in corresponding Korean Application No. 10-2014-0058648.
Communication dated Jan. 26, 2016, issued by the Korean Intellectual Property Office in corresponding Korean Application No. 10-2014-0143598.

* cited by examiner

FIG. 7
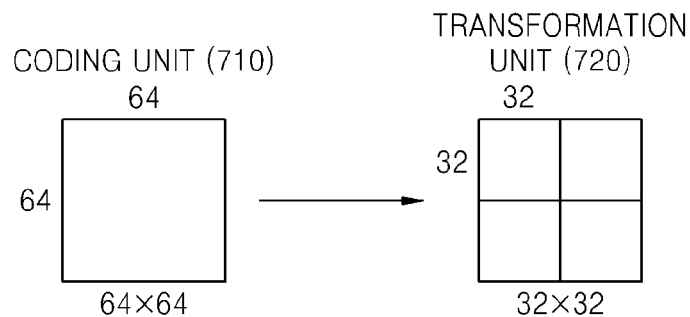
FIG. 8
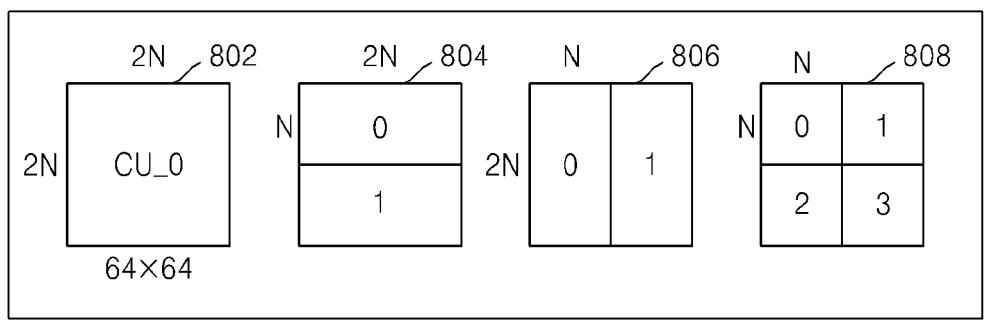
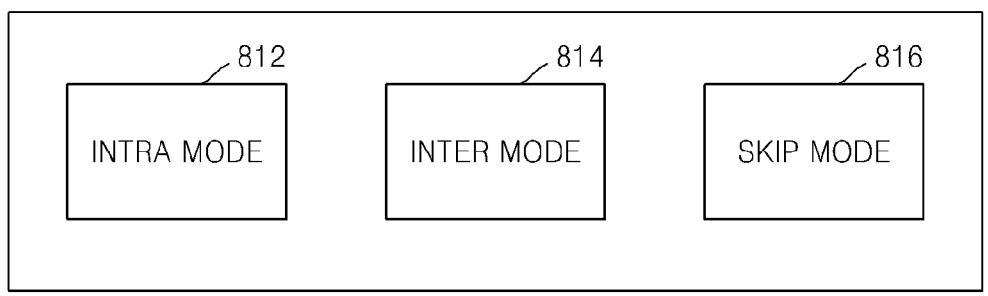
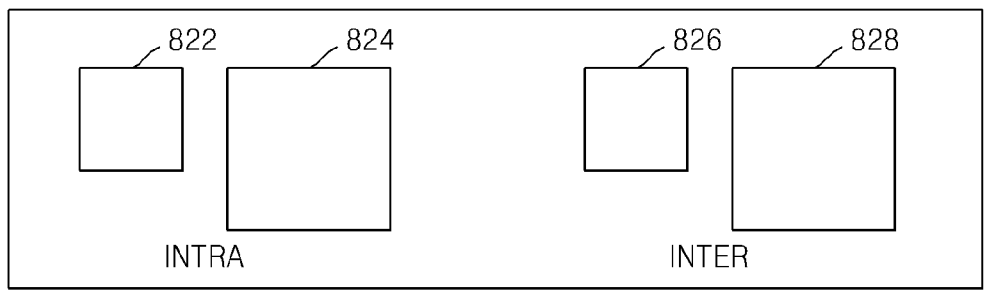

CODING UNIT (1010)

PREDICTION UNIT (1060)

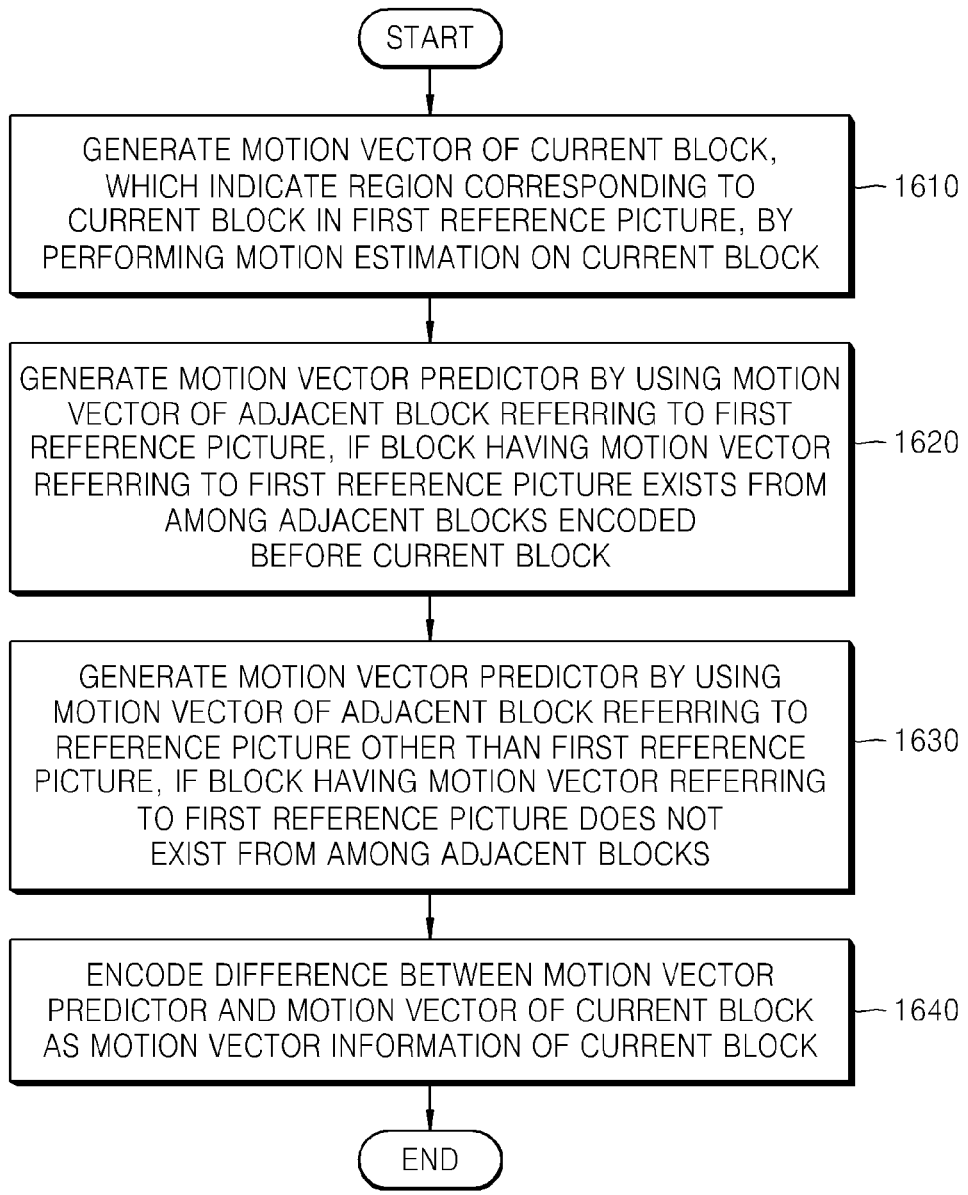

METHODS AND APPARATUSES FOR ENCODING AND DECODING MOTION VECTOR

CROSS-REFERENCE TO RELATED PATENT APPLICATION

This application is a Continuation of U.S. application Ser. No. 13/179,758 filed on Jul. 11, 2011, in the U.S. Patent and Trademark Office, which claims the benefit of U.S. Provisional Application No. 61/362,809, filed on Jul. 9, 2010, in the United States Patent and Trademark Office, and priority from Korean Patent Application No. 10-2011-0019100, filed on Mar. 3, 2011, in the Korean Intellectual Property Office, the disclosures of which are incorporated herein in by reference in their entireties.

BACKGROUND

1. Field

Exemplary embodiments relate to methods and apparatuses for encoding and decoding a still image and a moving image, and more particularly, to methods and apparatuses for encoding and decoding a motion vector of a current block by predicting the motion vector.

2. Description of the Related Art

In Codec, such as MPEG-4 H.264 or MPEG-4 advanced video coding (AVC), motion vectors of pre-encoded blocks adjacent to a current block are used to predict a motion vector of the current block. Here, a median of motion vectors of previously encoded blocks adjacent to left, top, and upper right of a current block is used as a motion vector predictor of the current block.

SUMMARY

Exemplary embodiments provide methods and apparatuses for encoding and decoding a motion vector.

According to an aspect of the exemplary embodiments, there is provided a method of encoding a motion vector, the method comprising: performing motion estimation on a current block of a current picture and generating a motion vector of the current block, the motion vector of the current block indicating a region in a first reference picture that corresponds to the current block, based on the motion estimated current block; determining whether an adjacent block having a motion vector referring to the first reference picture exists from among adjacent blocks encoded before the current block; one of generating a motion vector predictor using the determined motion vector of the adjacent block referring to the first reference picture, in response to determining that the adjacent block having the motion vector referring to the first reference picture exists, and generating the motion vector predictor by using a motion vector of an adjacent block referring to a second reference picture other than the first reference picture, in response to determining that the adjacent block having the motion vector referring to the first reference picture does not exist; and encoding a difference between the motion vector predictor and the motion vector of the current block as motion vector information of the current block.

According to another aspect of the exemplary embodiments, there is provided a method of decoding a motion vector, the method comprising: decoding from a bitstream motion vector predictor information that indicates a motion vector predictor of a current block of the bitstream; decoding a difference between a motion vector of the current block and the motion vector predictor of the current block; generating the motion vector predictor of the current block based on the decoded motion vector predictor information; and restoring the motion vector of the current block based on the motion vector predictor and the decoded difference, wherein the motion vector predictor is a motion vector predictor generated from one of a motion vector of an adjacent block referring to a first reference picture, if a block having a motion vector referring to the first reference picture identical to the first block exists from among adjacent blocks of the current block, and a motion vector of an adjacent block referring to a second reference picture other than the first reference picture, if the block having the motion vector referring to the first reference picture does not exist from among the adjacent blocks.

According to another aspect of the exemplary embodiments, there is provided an apparatus for encoding a motion vector, the apparatus comprising: a motion estimator that performs motion estimation on a current block of a current picture and generates a motion vector of a current block, the motion vector of the current block indicating a region in a first reference picture that corresponds to the current block, based on the motion estimated current block; and a motion vector encoder that determines whether an adjacent block having a motion vector referring to the first reference picture exists from among adjacent blocks encoded before the current block, one of generates a motion vector predictor using the motion vector of the adjacent block referring to the first reference picture, in response to determining that the adjacent block having the motion vector referring to the first reference picture exists and generates the motion vector predictor by using a motion vector of an adjacent block referring to a second reference picture other than the first reference picture, in response to determining that the adjacent block having the motion vector referring to the first reference picture does not exist, and encodes a difference between the motion vector predictor and the motion vector of the current block as motion vector information of the current block.

According to another aspect of the exemplary embodiments, there is provided an apparatus for decoding a motion vector, the apparatus comprising: a motion vector decoder that decodes from a bitstream motion vector predictor information that indicates a motion vector predictor of a current block of the bitstream, and decodes a difference between a motion vector of the current block and the motion vector predictor of the current block; and a motion compensator that generates the motion vector predictor of the current block based on the decoded motion vector predictor information, and restores the motion vector of the current block based on the motion vector predictor and the decoded difference, wherein the motion vector predictor is a motion vector predictor generated from one of a motion vector of an adjacent block referring to a first reference picture, if a block having a motion vector referring to the first reference picture identical to the first block exists from among adjacent blocks of the current block, and a motion vector of an adjacent block referring to a second reference picture other than the first reference picture, if the block having the motion vector referring to the first reference picture does not exist from among the adjacent blocks.

BRIEF DESCRIPTION OF THE DRAWINGS

The above and other aspects will become more apparent by describing in detail exemplary embodiments thereof with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 16 is a flowchart illustrating a method of encoding a motion vector, according to an exemplary embodiment;

DETAILED DESCRIPTION OF EXEMPLARY EMBODIMENTS

Hereinafter, the exemplary embodiments will be described more fully with reference to the accompanying drawings, in which the exemplary embodiments are shown.

Figure 1:
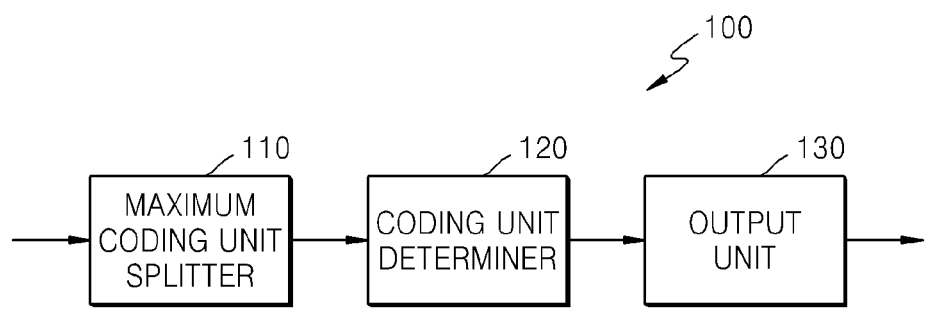
FIG. 1 is a block diagram of an apparatus for encoding a video, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., where a shape of the data unit is a square having a width and length in squares of 2, which is higher than 8. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splits from a maximum coding unit to a minimum coding unit. A first maximum depth according to an exemplary embodiment may denote the total number of splits from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a prediction unit. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a transformation unit. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of splits to reach the transformation unit by splitting the height and width of the coding unit may also be set in the transformation unit. For example, in a current coding unit of 2N×2N, a transformation depth may be 0 when the size of a transformation unit is also 2N×2N, a transformation depth may be 1 when the size of the transformation unit is thus N×N, and a transformation depth may be 2 when the size of the transformation unit is thus N/2×N/2. In other words, the transformation units having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
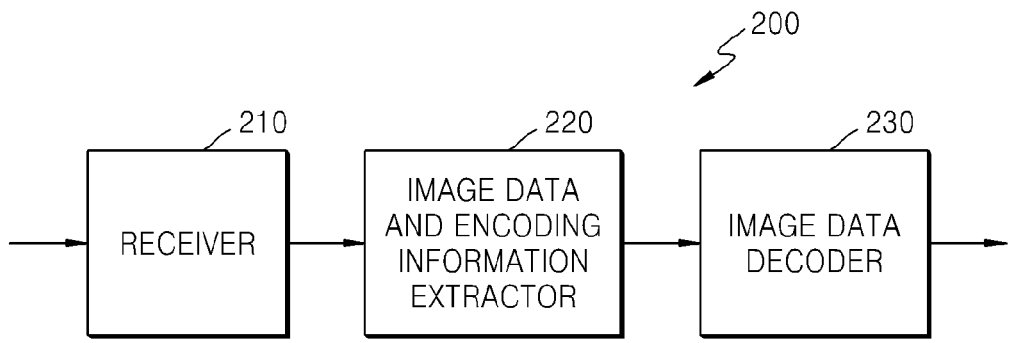
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Various terms, such as a coding unit, a depth, a prediction unit, a transformation unit, and information about various encoding modes, for various operations of the video decoding apparatus 200 are similar to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, where the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
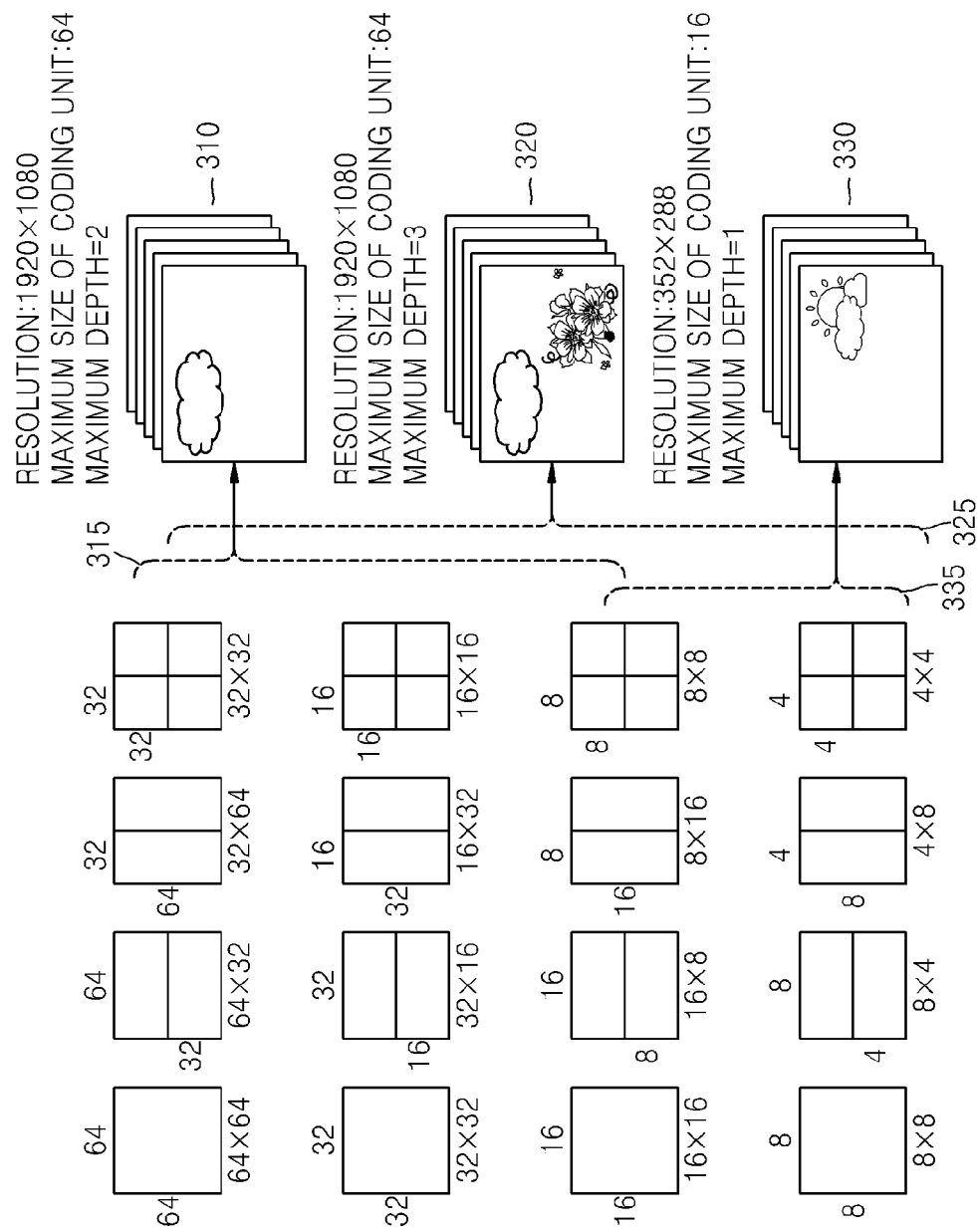
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
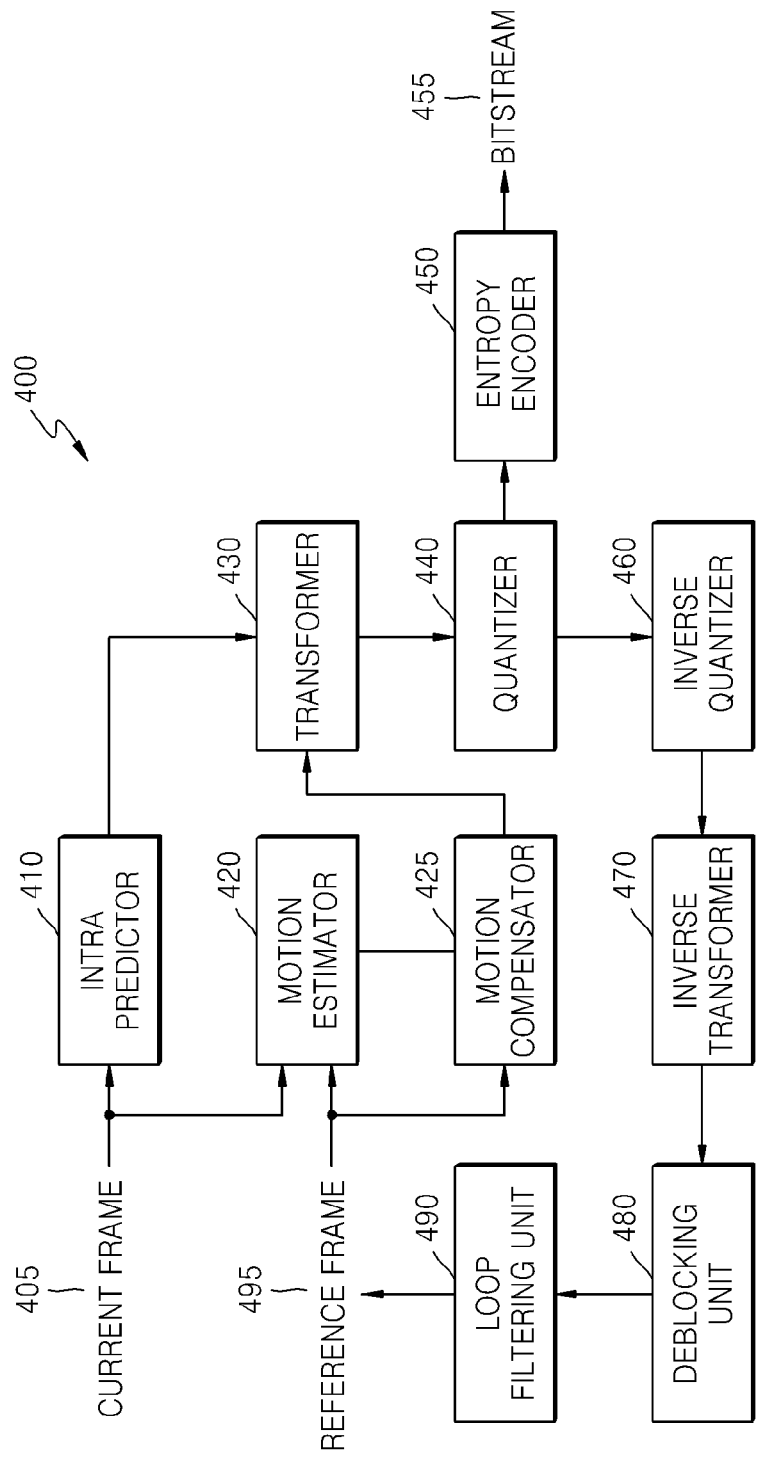
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
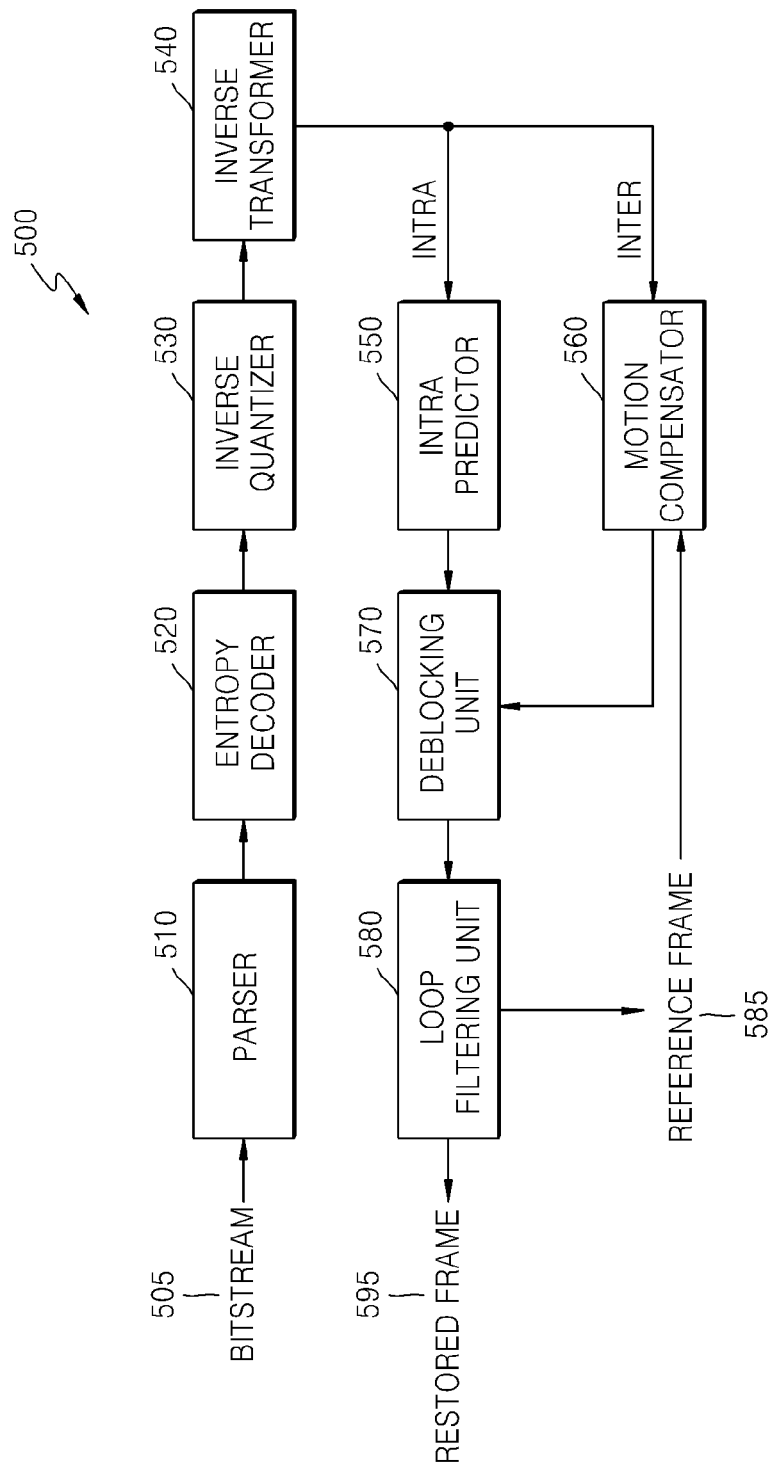
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
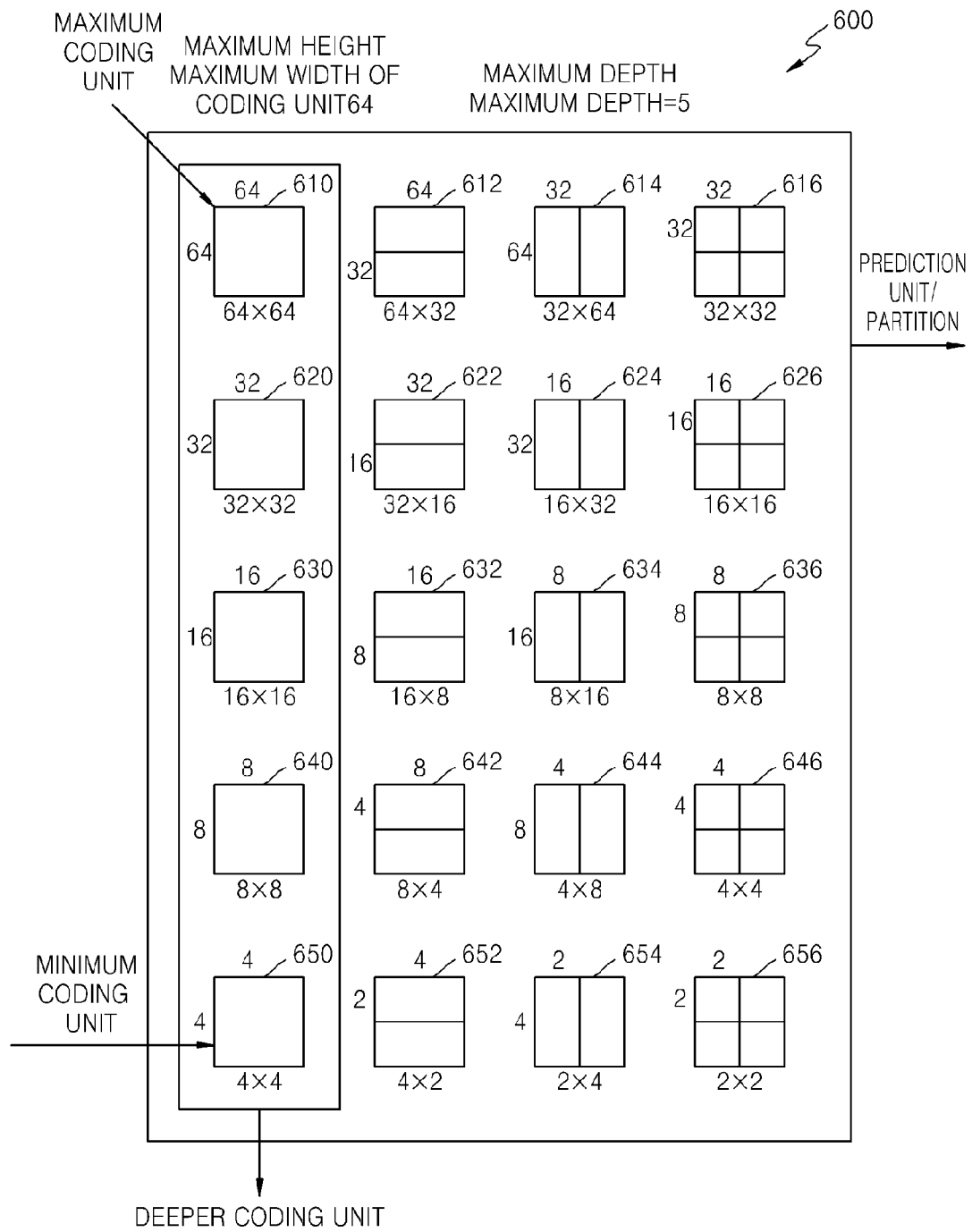
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
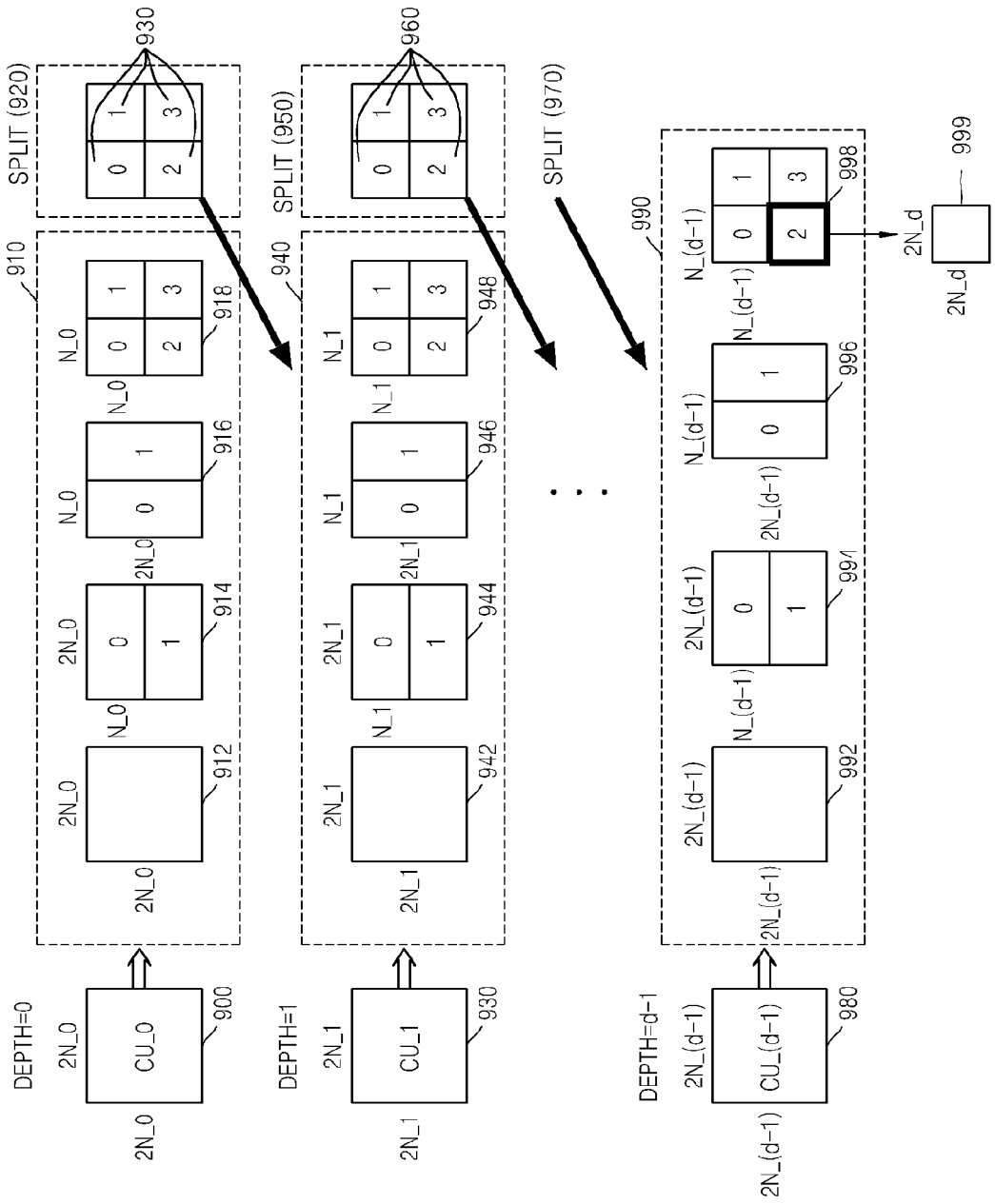
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1)

may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By repeatedly performing the encoding, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
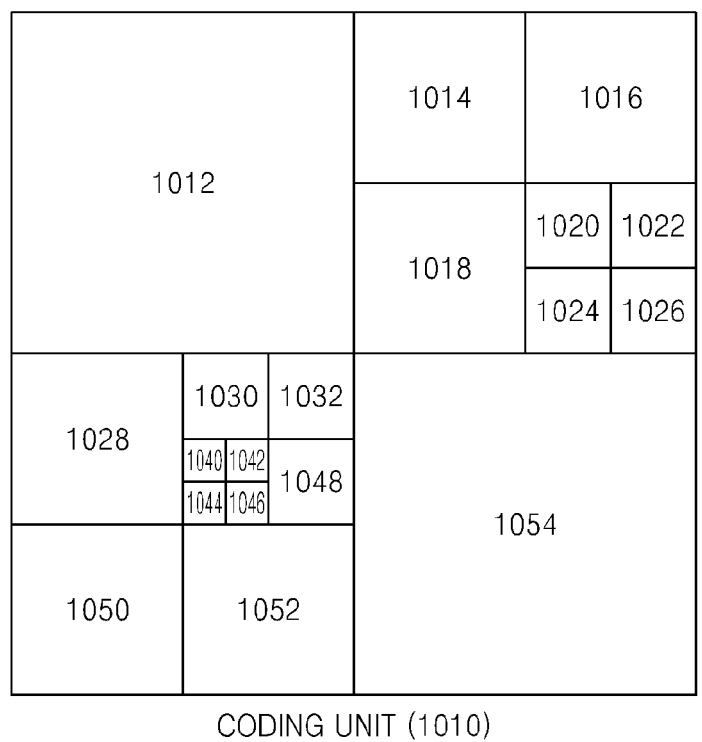
FIGS. 10 through 12 are diagrams for describing a relationship between coding units, prediction units, and transformation units, according to an exemplary embodiment.
Figure 11:
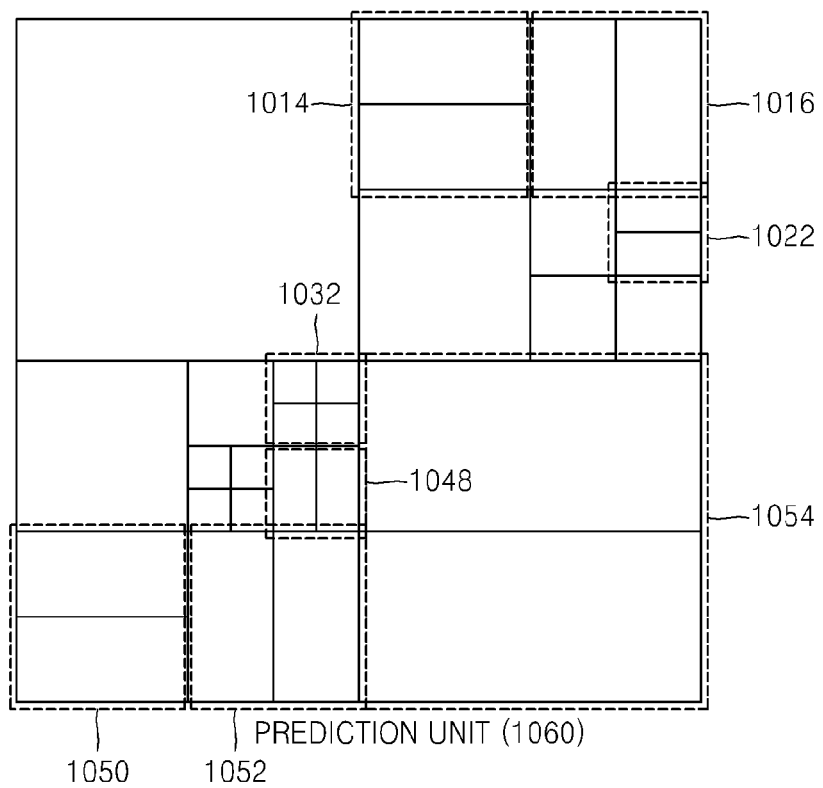
Figure 12:
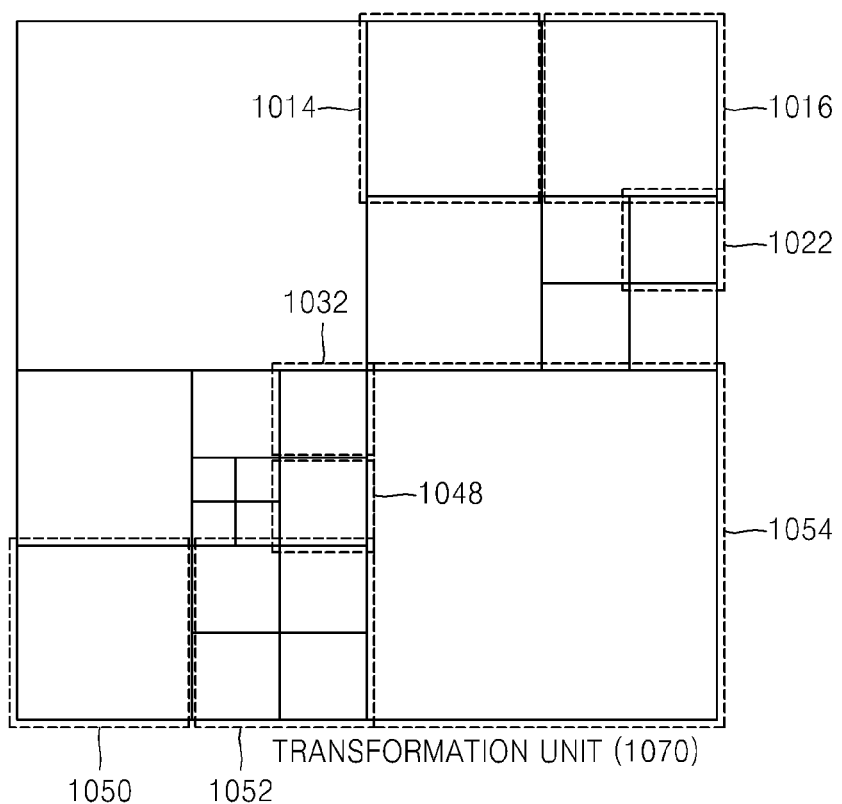

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may individually perform intra prediction, motion estimation, motion compensation, transformation, and inverse transformation on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| | Split Information 0 (Encoding on Coding Unit having Size of 2N × 2N and Current Depth of d) | | | | Split Information 1 |
|---|---|---|---|---|---|
| | | | Size of Transformation Unit | | |
| | Partition Type | | Split Information 0 of Transformation Unit | Split Information 1 of Transformation Unit | |
| Prediction Mode | Symmetrical Partition Type | Asymmetrical Partition Type | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth. Thus, information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred for predicting the current coding unit.

Figure 13:
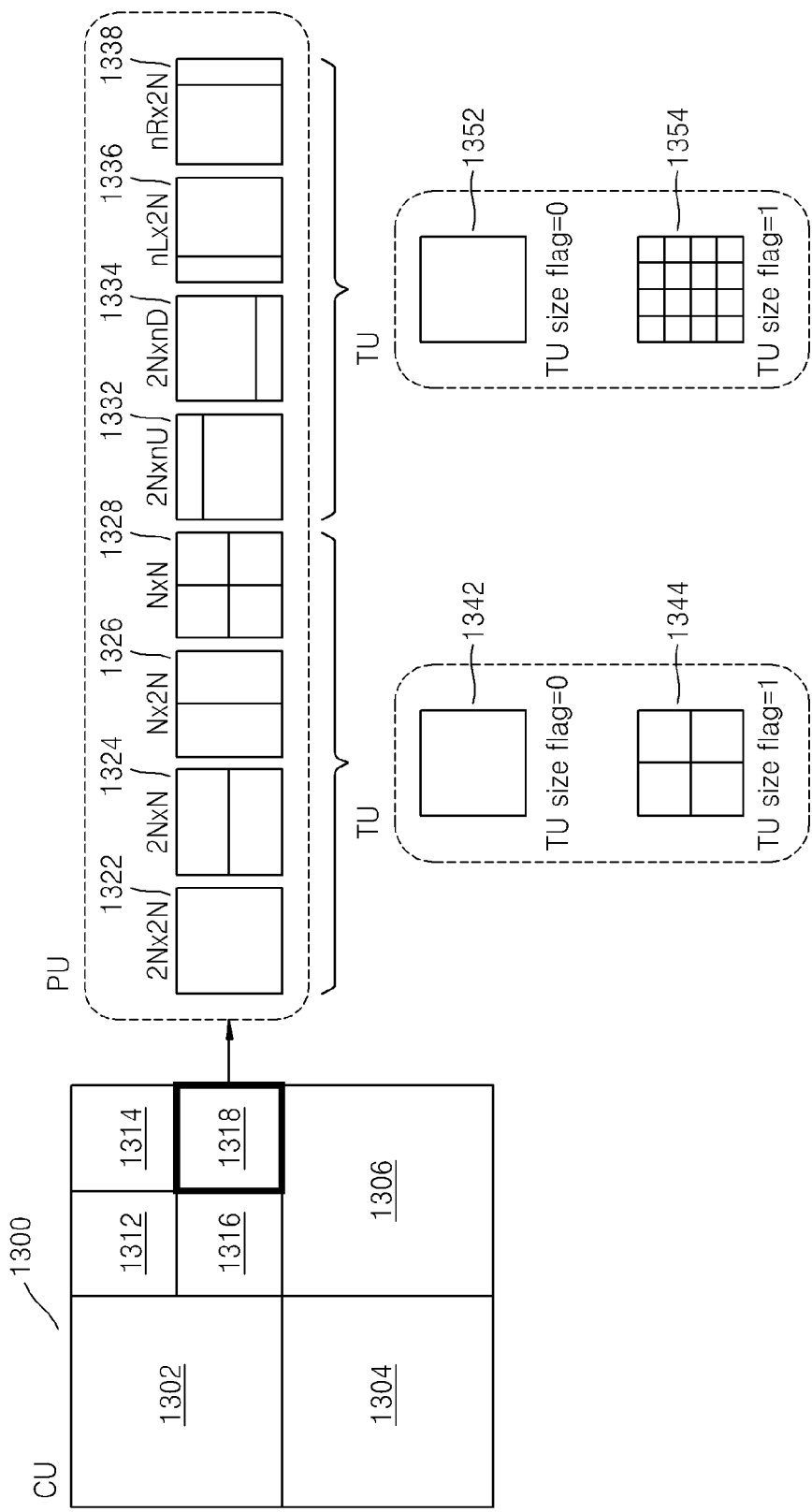
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

The motion estimation and compensation performed by the motion estimator 420 and the motion compensator 425 of the video encoding apparatus 100 of FIG. 4 and the motion compensator 560 of the video decoding apparatus 200 of FIG. 5 will now be described in detail. Hereinafter, the prediction unit described above will be referred to as a block.

Figure 14:
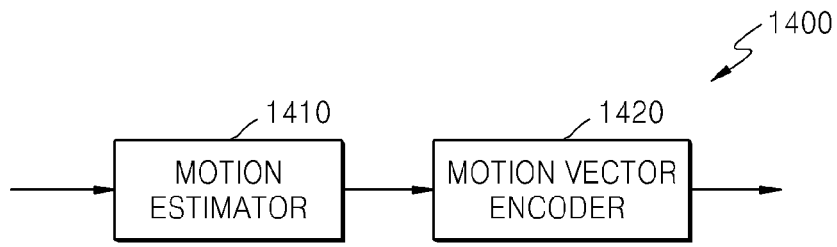
FIG. 14 is a block diagram of an apparatus for encoding a motion vector, according to an exemplary embodiment.

FIG. 14 is a block diagram of an apparatus 1400 for encoding a motion vector, according to an exemplary embodiment. The apparatus 1400 includes elements related to encoding a motion vector, such as the motion estimator 420 and the entropy encoder 450 of FIG. 4, wherein the entropy encoder 450 may perform operations performed by a motion vector encoder 1420 of FIG. 14.

Referring to FIG. 14, the apparatus 1400 according to the current exemplary embodiment includes a motion estimator 1410 and the motion vector encoder 1420.

The motion estimator 1410 generates a motion vector of a current block, which indicates a region corresponding to the current block in a first reference picture, by performing motion estimation on the current block.

Generally, a motion vector of a block is closely related to a motion vector of an adjacent block. Accordingly, a motion vector of a current block is estimated from a motion vector of an adjacent block, and only the motion vector of the adjacent block and a difference vector of the current block are encoded to reduce an amount of bits to be encoded. Accordingly, the motion vector encoder 1420 generates a motion vector predictor by using motion vector information of adjacent blocks to encode motion vector information of a current block, and encodes only a difference between the motion vector predictor and the motion vector of the current block as the motion vector information of the current block. In detail, the motion vector encoder 1420 generates the motion vector predictor by using a motion vector of an adjacent block referring to the first reference picture when a block having a motion vector referring to the first reference picture, which is referred to by the current block, exists from among adjacent blocks encoded before the current block, or by using a motion vector of a reference block referring to a reference picture other than the first reference picture when the block having the motion vector referring to the first reference picture does not exist from among the adjacent blocks, and then encodes the difference between the generated motion vector predictor and the motion vector of the current block as the motion vector information of the current block. As described above, a conventional image encoding apparatus uses a median of motion vectors of adjacent blocks adjacent to left, top and upper right of the current block as a motion vector of the current block. However, the apparatus 1400 generates a motion vector predictor candidate group from the adjacent blocks via one of various methods, and uses a motion vector predictor selected from the motion vector predictor candidate group, aside from a median, to encode the motion vector of the current block, thereby increasing image compression efficiency according to image characteristics.

The generating of the motion vector predictor performed by the motion vector encoder 1420 will now be described in detail.

Figure 15A:
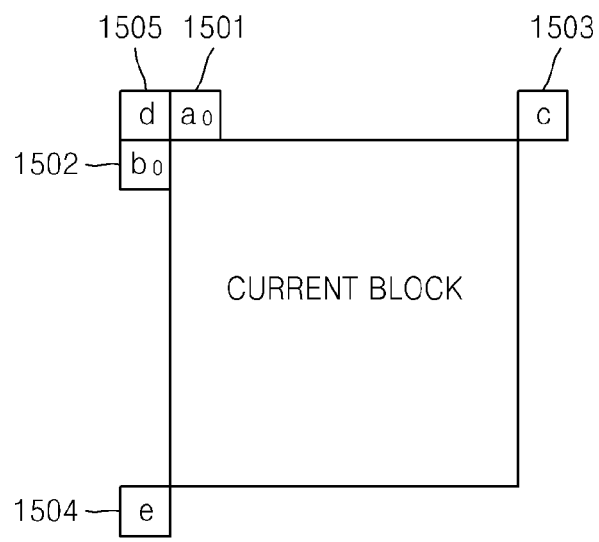
FIGS. 15A and 15B are diagrams of motion vector predictor candidates according to exemplary embodiments.
Figure 15B:
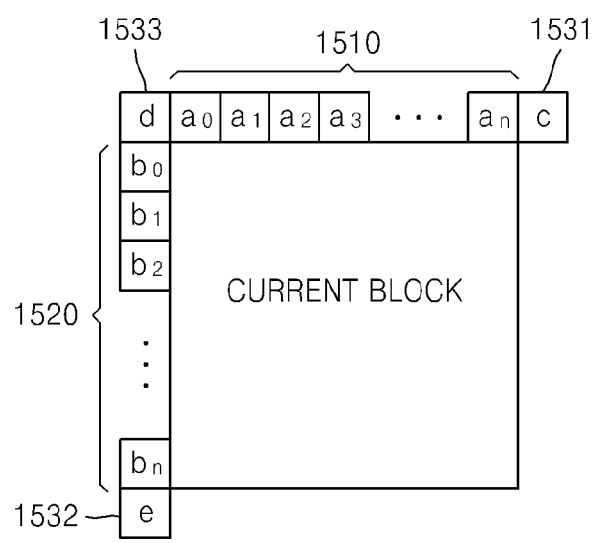

FIGS. 15A and 15B are diagrams of motion vector predictor candidates according to exemplary embodiments.

Referring to FIG. 15A, the motion vector encoder 1420 may use one of the motion vectors of the adjacent blocks encoded before the current block as the motion vector predictor of the current block. Any one of motion vectors of a leftmost a0 block 1501, a uppermost left b0 block 1502, upper right c block 1503, upper left d block 1505, and a lower left e block 1504 from among the adjacent blocks of the current block may be used as the motion vector predictor of the current block. Since video encoding and decoding methods are performed based on coding units having various sizes, which are classified according to depths, the motion vector of the lower left e block 1504 may also be used as the motion vector predictor of the current block. Referring back to FIG. 10, if the current block is the coding unit 1020, the coding units 1014, 1016, 1018, and 1022 at the top, upper left, upper right, left, and lower left of the current block 1020 are encoded before the current block 1020. In other words, since the coding unit 1018 is encoded before the coding unit 1020 including the current block, a motion vector of the block adjacent to the lower left of a current block may also be used as a motion vector predictor of the current block considering that the coding unit 1018 is encoded in a coding unit having a deeper depth.

Referring to FIG. 15B, motion vectors of all adjacent blocks of the current block may be used as the motion vector predictor of the current block. In other words, not only a motion vector of a leftmost a0 block from among blocks 1510 adjacent to the top of the current block, but also motion vectors of all blocks a0 through aN adjacent to the top of the current block may be used as the motion vector predictor of the current block, and not only a motion vector of an uppermost b0 block from among blocks 1520 adjacent to the left of the current block, but also motion vectors of all blocks b0 through bN adjacent to the left of the current block may be used as the motion vector predictor of the current block.

Alternatively, medians of motion vectors of adjacent blocks may be used as the motion vector predictor. In other words, medians mv_a0, mv_b0, and mv_c may be used as the motion vector predictor of the current block. Here, the median mv_a0 is the motion vector of the a0 block, the median mv_b0 is the motion vector of the b0 block, and the median mv_c is the motion vector of the c block.

However, motion vector predictor candidates may be limited according to a size of the current block and sizes of the adjacent blocks, which will be described in detail with reference to FIGS. 15C through 15E.

Figure 15C:
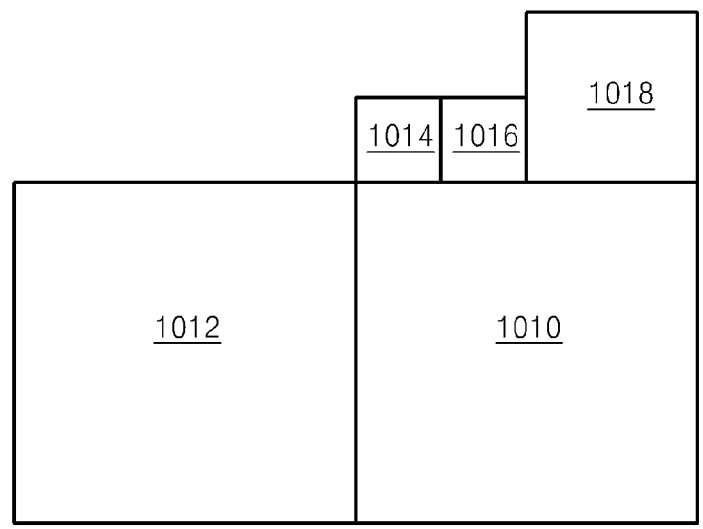
FIGS. 15C through 15E are diagrams of blocks having various sizes, which are adjacent to a current block, according to exemplary embodiments.
Figure 15D:
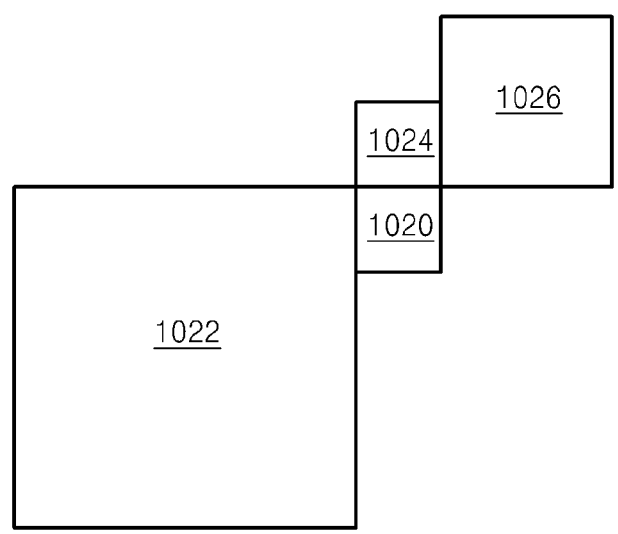
Figure 15E:
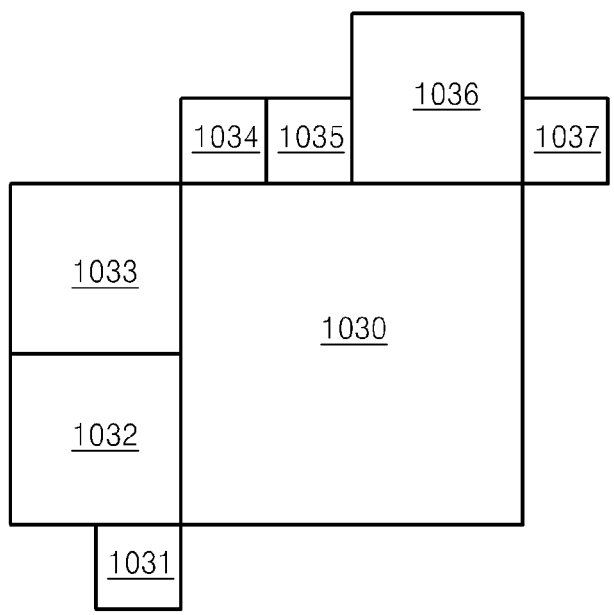

FIGS. 15C through 15E are diagrams of blocks having various sizes, which are adjacent to a current block, according to exemplary embodiments.

As described above, the image encoding and decoding methods encode and decode an image by using coding units and prediction units having various sizes, which are determined according to depths. Accordingly, sizes of the adjacent blocks of the current block may vary, and if the size of the current block and the sizes of some adjacent blocks are largely different, motion vectors of the some adjacent blocks may not be used as the motion vector predictor of the current block.

Referring to FIG. 15C, adjacent blocks 1014 through 1018 at the top of a current block 1010 have sizes smaller than the current block 1010. Since a motion vector of the adjacent block 1012 having the same size as the current block 1010 is highly likely to be identical or similar to a motion vector of the current block 1010, the motion vector encoder 1420 may use only the motion vector of the adjacent block 1012 as the motion vector predictor.

Even if sizes are not the same, motion vectors of adjacent blocks having a predetermined size or above may be used as the motion vector predictor. For example, the adjacent blocks 1012 and 1018 having ¼ or above sizes compared to the current block 1010 may be used as the motion vector predictor.

Referring to FIG. 15D, a size of an adjacent block 1022 adjacent to the left of a current block 1020 is 16 times as much as a size of the current block 1020, and thus there is a remarkable size difference. Due to the remarkable size difference, a motion vector of the adjacent block 1022 is not likely to be identical or similar to a motion vector of the current block 1020. Accordingly, the motion vector of the adjacent block 1022 is not used as the motion vector predictor of the current block 1020, and motion vectors of an adjacent block 1024 at the top of the current block 1020 and an adjacent block 1026 at the upper right of the current block 1020 may be used.

Referring to FIG. 15E, a size of a current block 1030 is larger than sizes of all adjacent blocks 1031 through 1037. Here, if motion vectors of the adjacent blocks 1031 through 1037 are used as the motion vector predictor of the current block 1030, a number of motion vector predictor candidates of the current block 1030 may be too much. As a difference between sizes of the current block 1030 and the adjacent blocks 1031 through 1037 increases, the number of motion vector predictor candidates also increases. Accordingly, the motion vector encoder 1420 does not use motion vectors of some adjacent blocks as the motion vector predictor of the current block.

For example, in FIG. 15E, the motion vectors of the adjacent block 1031 adjacent to the lower left of the current block 1030 and the motion vector of the adjacent block 1037 adjacent to the upper right of the current block 1030 may not be used as the motion vector predictor of the current block 1030. In other words, if the size of the current block 1030 is equal to or above a predetermined size, motion vectors of adjacent blocks in a predetermined direction may not be used as the motion vector predictor of the current block 1030.

Alternatively, instead of generating the motion vector predictor candidates by limiting the motion vector predictor candidates according to the size of the current block and the sizes of the adjacent blocks, the motion vector encoder 1420 may generate the motion vector predictor from the adjacent blocks based on whether a reference picture identical to the first reference picture that is referred to by the current block is used, whether a reference picture located in the same list direction as the first reference picture is used, and whether a reference picture located in a different list direction from the first reference picture is used.

FIG. 16 is a flowchart illustrating a method of encoding a motion vector, according to an exemplary embodiment. While generating the motion vector predictor candidates, the motion vector encoder 1420 may generate the motion vector predictor candidates by using a motion vector of an adjacent block using a reference picture identical to the first reference picture that is referred to by the current block, a motion vector of an adjacent block using another reference picture located at the same direction as the first reference picture if the reference picture using the reference picture identical to the first reference picture does not exist, and a motion vector of a motion block referring to another reference picture located in a different list direction as the first reference picture if the adjacent block referring to the other reference picture located in the same direction as the first reference picture does not exist.

Referring to FIG. 16, the motion estimator 1410 generates the motion vector of the current block, which indicates the region corresponding to the current block in the first reference picture, by performing motion estimation on the current block, in operation 1610.

If a block having a motion vector referring to the first reference picture exists from among the adjacent blocks encoded before the current block, the motion vector encoder 1420 generates the motion vector predictor by using the motion vector of the adjacent block referring to the first reference picture in operation 1620, and if the block having the motion vector referring to the first reference picture does not exist from among the adjacent blocks, the motion vector encoder 1420 generates the motion vector predictor by using the motion vector of the adjacent block referring to the reference picture other than the first reference picture in operation 1630.

In operation 1640, the motion vector encoder 1420 encodes a difference between the motion vector predictor and the motion vector of the current block as the motion vector information of the current block.

Figure 17:
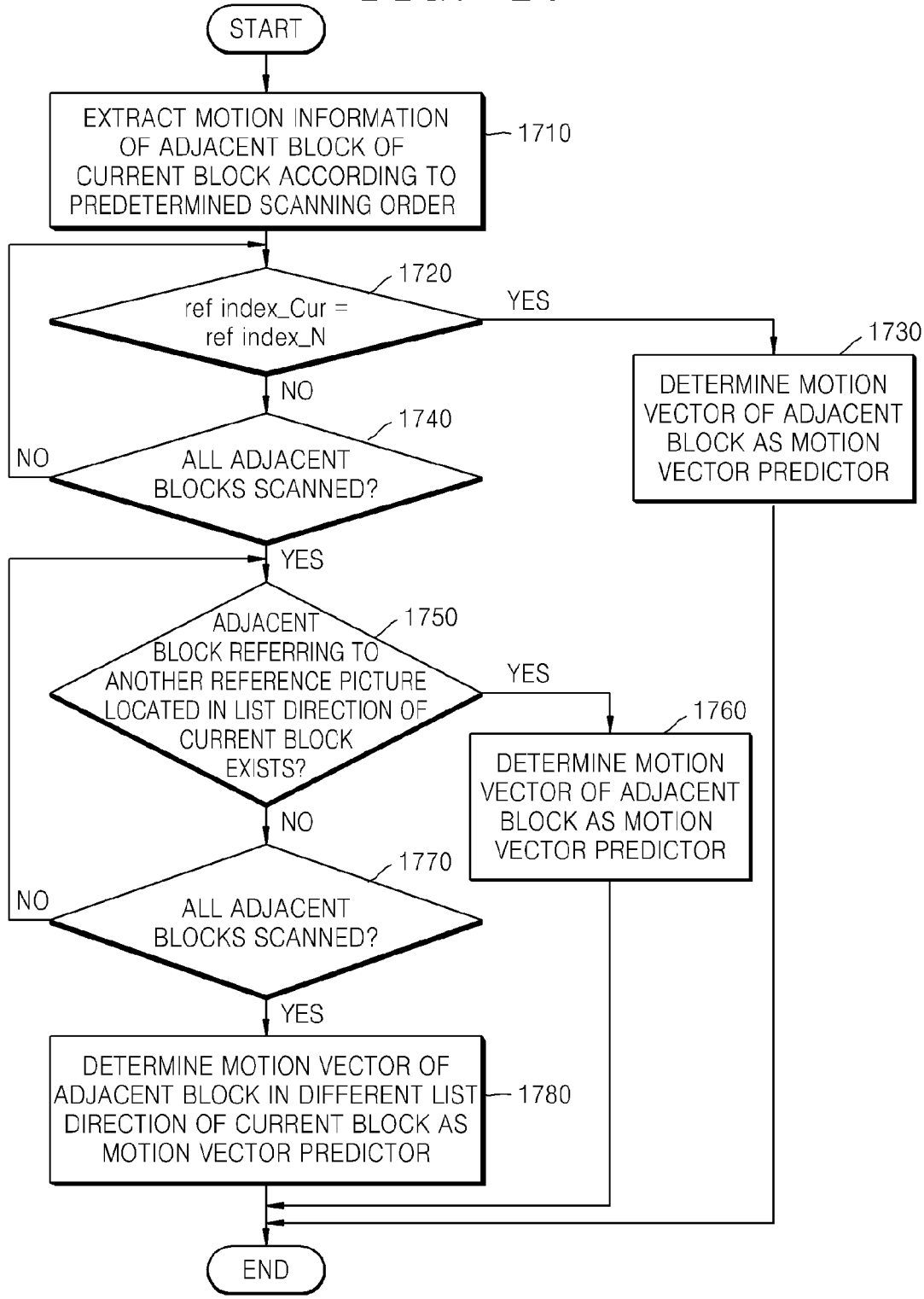
FIG. 17 is a flowchart illustrating generating of a motion vector predictor, according to an exemplary embodiment.

FIG. 17 is a flowchart illustrating in detail the generating of the motion vector predictor, according to an exemplary embodiment.

Referring to FIG. 17, the motion vector encoder 1420 extracts motion information of an adjacent block of a current block according to a predetermined scanning order, in operation 1710. The motion information of the adjacent block includes reference picture information ref index_N referred to by the adjacent block and motion vector information of the adjacent block. The motion vector encoder 1420 selects a first motion vector predictor from a block adjacent to the left of the current block, a second motion vector predictor from a block adjacent to the top of the current block, and a third motion vector predictor from a block located at the corner of the current block. In order to select the first through third motion vector predictors, a reference picture of each block located at the top, left, and corner of the current block is compared with reference picture information referred to by the current block. Referring back to FIG. 15B, the predetermined scanning order is from top to bottom in the blocks 1520, i.e., from the block b0 to the block bn, and from the left to right in the blocks 1510, i.e., from the block a0 to the block an. The c, e, and d blocks 1531, 1532, and 1533 may be scanned in an order of the block c 1531, the block d 1533, and the block e 1532. However, the predetermined scanning order may differ.

In operation 1720, the motion vector encoder 1420 compares reference picture information ref index_Cur referred to by the current block and the reference picture information ref index_N of the adjacent block to determine whether a reference picture of the adjacent block is identical to a reference picture, i.e., the first reference picture, referred to by the current block. When it is determined that the reference picture of the adjacent block is identical to the first reference picture in operation 1720, the motion vector of the adjacent block is determined to be the motion vector predictor in operation 1730. Operations 1720 and 1730 are performed according to groups of the blocks 1510 located at the top of the current block, the blocks 1520 located at the left of the current block, and the blocks 1531 through 1533 located at the corner of the current block to generate the first through third motion vector predictors.

In operation 1740, it is determined whether operation 1720 is performed on all adjacent blocks according to the groups of blocks 1510, blocks 1520, and blocks 1531 through 1533. If any one of the groups of blocks 1510, blocks 1520, and blocks 1531 through 1533 does not include an adjacent block referring to the reference picture identical to the first reference picture, it is determined whether an adjacent block referring to another reference picture that is not identical to the first reference picture but located in a list direction of the current block exists in operation 1750. Here, the list direction denotes an L0 direction referring to a previous picture before the current picture and an L1 direction referring to a next picture after the current picture.

If it is determined that the adjacent block refers to the other reference picture in operation 1750, a motion vector of the adjacent block is determined to be the motion vector predictor in operation 1760. In operation 1770, it is determined whether operation 1750 is performed on all adjacent blocks, i.e., the blocks 1510, the blocks 1520, and the blocks 1531 through 1533. If any one of the groups of blocks 1510, blocks 1520, and blocks 1531 through 1533 does not include the adjacent block referring to the other reference picture that is not identical to the first reference picture but located in the list direction of the current block, a motion vector of an adjacent block referring to another reference picture that is located in a different list direction from the first reference picture is determined to be the motion vector predictor of the current block in operation 1780.

In other words, the method and apparatus for encoding a motion vector, according to an exemplary embodiment, generate the first motion vector predictor from the adjacent blocks located at the left of the current block, the second motion vector predictor from the adjacent blocks located at the top of the current block, and the third motion vector predictor from the adjacent blocks located at the corner of the current block, and at this time, the adjacent blocks are scanned in an order of the motion vector of the adjacent block referring to the first reference picture, the motion vector of the adjacent block referring to the other reference picture different from the first reference picture but existing in the same list direction as the current block, and the motion vector of the adjacent block referring to the other reference picture in the different list direction from the current block to determine the motion vector predictor candidates of the current block.

Figure 18A:
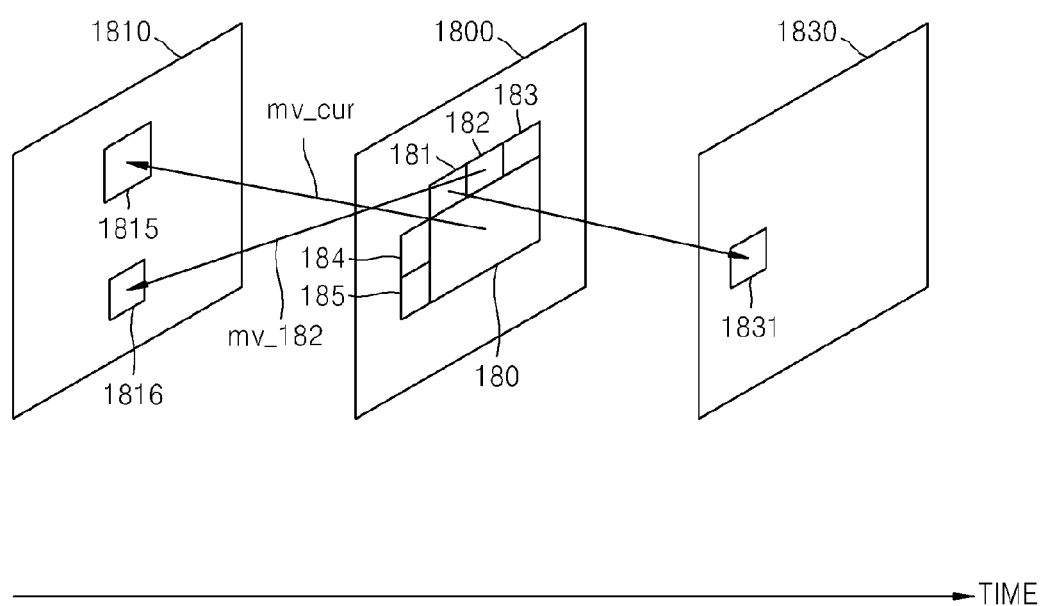
FIGS. 18A through 18C are reference diagrams for describing determining of a motion vector predictor, according to exemplary embodiments.
Figure 18B:
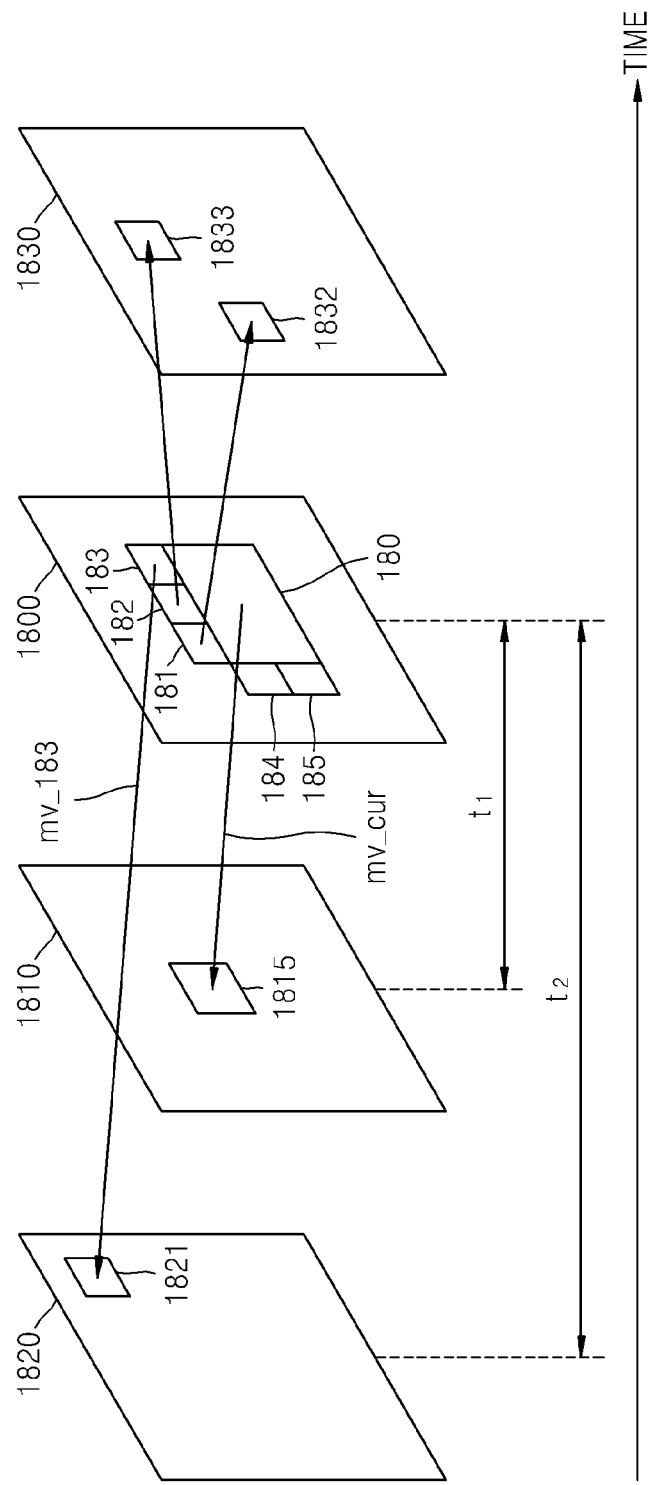
Figure 18C:
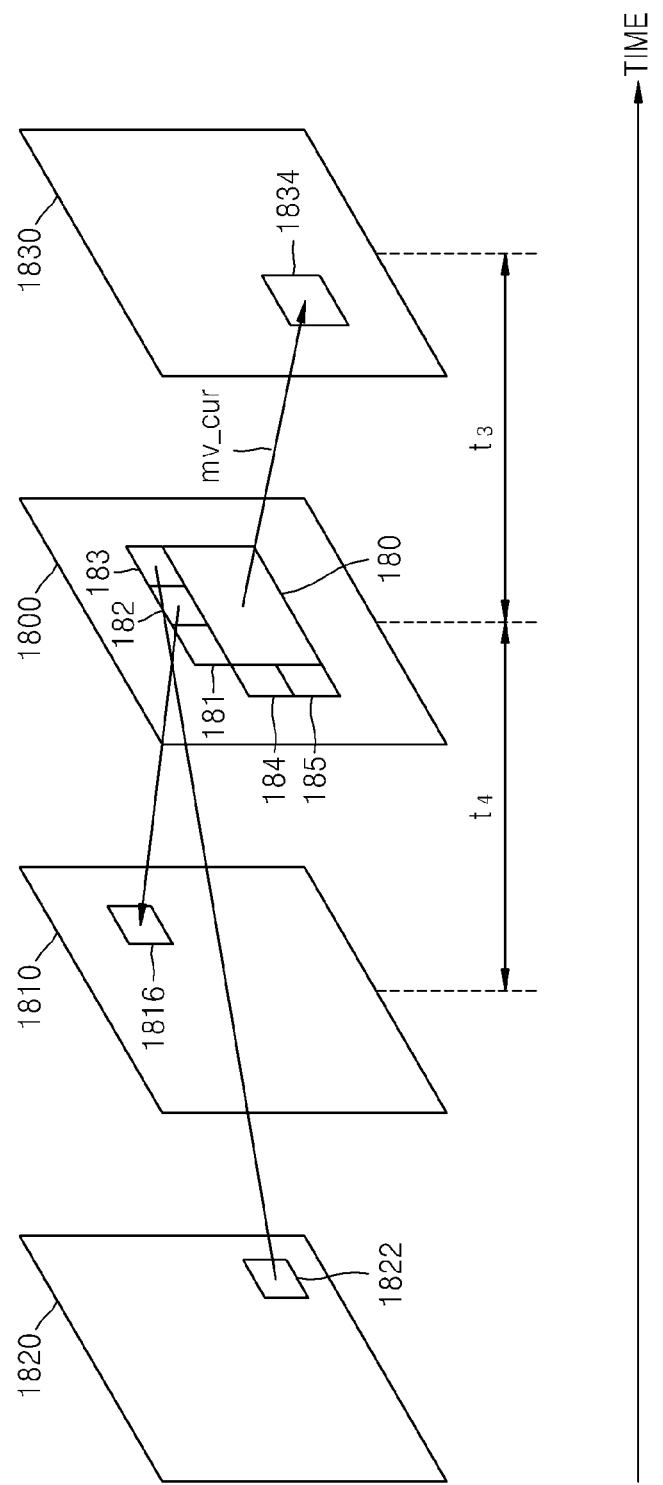

FIGS. 18A through 18C are reference diagrams for describing in detail the determining of the motion vector predictor, according to exemplary embodiments.

FIG. 18A is a diagram for describing generation of the motion vector predictor if an adjacent block referring to a first reference picture 1810 referred to by the current block exists.

Referring to FIG. 18A, the motion vector encoder 1420 generates a first motion vector predictor from adjacent blocks 184 and 185 located at the left of a current block 180, a second motion vector predictor from adjacent blocks 181 through 183 located at the top of the current block 180, and a third motion vector predictor from blocks (not shown) located at the corner of the current block 180. The generating of the second motion vector predictor from the blocks 181 through 183 will now be described in detail as an example. The generating of the second motion vector predictor will be similarly applied while generating the first and third motion vector predictors.

When the first reference picture 1810 is referred by the current block 180 of a current picture 1800, the motion vector encoder 1420 scans the adjacent blocks 181 through 183 in an order from left to right to determine whether a reference picture referred to by the adjacent blocks 181 through 183 is identical to the first reference picture 1810. In FIG. 18A, It is assumed that the adjacent block 181 refers to a region 1831 of a reference picture 1830 after the current picture 1800, the adjacent block 182 is a motion adjacent block predicted via a region 1816 of the first reference picture 1810 identical to the current block 180, and the block 183 is an intra predicted block. Here, the motion vector encoder 1420 determines a motion vector mv_182 of the adjacent block 182 that is initially effective and referring to the first reference picture 1810 as the second motion vector predictor. As such, when the adjacent block 182 refers to the first reference picture 1810 identical to the current picture 1800, the motion vector mv_182 of the adjacent block 182 may not be separately scaled since a temporal distance of the motion vector mv_182 is identical to that of a motion vector mv_cur of the current block 180 via region 1815. However, the motion vector encoder 1420 may not select the motion vector mv_182 of the adjacent block 182 as the second motion vector predictor if a size of the adjacent block 182 is below or equal to a predetermined threshold value compared to the current block 180, as described above with reference to FIGS. 15C through 15E. If the adjacent block 182 referring to the first reference picture 1810 does not exist as shown in FIG. 18A, the generating of the motion vector predictor described with reference to of FIG. 18B is performed.

FIG. 18B is a diagram for describing generation of the motion vector predictor when the adjacent block referring to the first reference picture 1810 does not exist, but an adjacent block referring to another reference picture located in the same list direction as the first reference picture 1810 exists.

Referring to FIG. 18B, it is assumed that the adjacent blocks 181 and 182 refer to regions 1832, 1833 of the reference picture 1830 after the current picture 1800, and the adjacent block 183 is a motion block predicted via a region 1821 of reference picture 1820, which is not the first reference picture 1810 but in the same list direction as the first reference picture 1810, i.e., temporally before the current picture 1800. Here, the motion vector encoder 1420 determines a motion vector mv_183 of the adjacent block 183 that is initially effective and referring to the reference picture 1820 in the same list direction as the first reference picture 1810, as the second motion vector predictor. As such, when the adjacent block 183 refers to the reference picture 1820, since temporal distances of the first reference picture 1810 and the reference picture 1820 are different from each other, the motion vector mv_183 of the adjacent block 183 is scaled while considering a temporal distance t1 between the current picture 1800 and the first reference picture 1810, and a temporal distance t2 between the current picture 1800 and the reference picture 1820. In detail, the motion vector encoder 1420 performs scaling by multiplying the motion vector mv_183 by a value of (t1/t2), thereby determining mv_183×(t1/t2) as the second motion vector predictor. In other words, when CurrPOC denotes a picture order count (POC) of the current picture 1800, CurrRefPOC denotes a POC of a reference picture referred to by the current block 180, and NeighRefPOC denotes a POC of a reference picture referred to by an adjacent block, a scale value is calculated via an equation; Scale=(CurrPOC−CurrRefPOC)/(CurrPOC−NeighRefPOC), and the scaling is performed by multiplying the determined motion vector by the scale value.

If even the adjacent block referring to the other reference picture located in the same list direction as the first reference picture 1810 does not exist, the motion vector predictor may be generated, as will be described with reference to FIG. 18C.

FIG. 18C is a diagram for describing the generating of the motion vector predictor when the adjacent block referring to the other reference picture located in the same list direction as the first reference picture 1810 does not exist.

Referring to FIG. 18C, it is assumed that the current block 180 refers to the first reference picture 1830 via region 1834 after the current picture 1800, the adjacent blocks 181 is an intra predicted block, the adjacent block 182 refers to the reference picture 1810 via region 1816 before the current picture 1800, and the adjacent block 183 is a motion block referring to the reference picture 1820 via region 1822 before the current picture 1800. In other words, in FIG. 18C, an adjacent block referring to the first reference picture 1830 referred to by the current block 180 does not exist from among upper blocks of the current block 180, and an adjacent block using a picture after the current picture 1800 as a reference picture also does not exist. Here, the motion vector encoder 1420 determines the motion vector mv_182 of the adjacent block 182 that is initially effective and referring to the reference picture 1810 in the different list direction from the first reference picture 1830, i.e., before the current picture 1800, as the second motion vector predictor. When the adjacent block 182 refers to the reference picture 1810 in the different list direction, instead of the first reference picture 1830, since temporal distances of the first reference picture 1830 and the reference picture 1810 are different from each other, the motion vector mv_182 of the adjacent block 182 is scaled while considering a temporal distance t3 between the current picture 1800 and the first reference picture 1830, a temporal distance t4 between the current picture 1800 and the reference picture 1810, and the list direction. In detail, the motion vector encoder 1420 performs scaling by multiplying the motion vector mv_182 of the adjacent block 182 by a value of −(t3/t4), and determines −(mv_182×(t3/t4)) as the second motion vector predictor.

The motion vector encoder 1420 determines the first and third motion vector predictors by performing the processes described with reference to FIGS. 18A through 18C according to groups of blocks at the left and corner of the current block 180. When the first through third motion vector predictors are determined, the motion vector encoder 1420 may further include medians of the first through third motion vector predictors as the motion vector predictor candidates. If none of the first through third motion vector predictors exist, the motion vector encoder 1420 sets a 0 vector as a median. If only one of the first through third motion vector predictors exists, the motion vector encoder 1420 sets an existing motion vector predictor as a median. If only two of the first through third motion vector predictors exist, the motion vector encoder 1420 may set an non-existing motion vector predictor as a 0 vector, and calculate a median according to components of x and y axes, and include the calculated median in the motion vector predictor candidates.

Meanwhile, while determining the medians of the motion vectors of the adjacent blocks, the motion vector encoder 1420 may calculate a median by only using motion vectors in the same type. In other words, the motion vector encoder 1420 may determine the first through third motion vector predictors by only using motion vectors referring to the first reference picture identical to the current block from among the motion vectors of the adjacent blocks of the current block, and include the medians of the first through third motion vector predicts in the motion vector predictor candidate of the current block.

Alternatively, as described above, the motion vector encoder 1420 may determine the first through third motion vector predictors by using the motion vector of the adjacent block referring to another reference picture in the same list direction as the first reference picture, or the motion vector of the adjacent block referring to another reference picture in the different list direction from the first reference picture, and include the medians of the third through third motion vector predictors in the motion vector predictor candidates of the current block. Here, the motion vector encoder 1420 may include the medians of the first through third motion vector predictors in the motion vector predictor candidates only when all of the first through third motion vector predictors determined in the adjacent blocks refer to the other reference picture different from the current block.

Figure 19A:
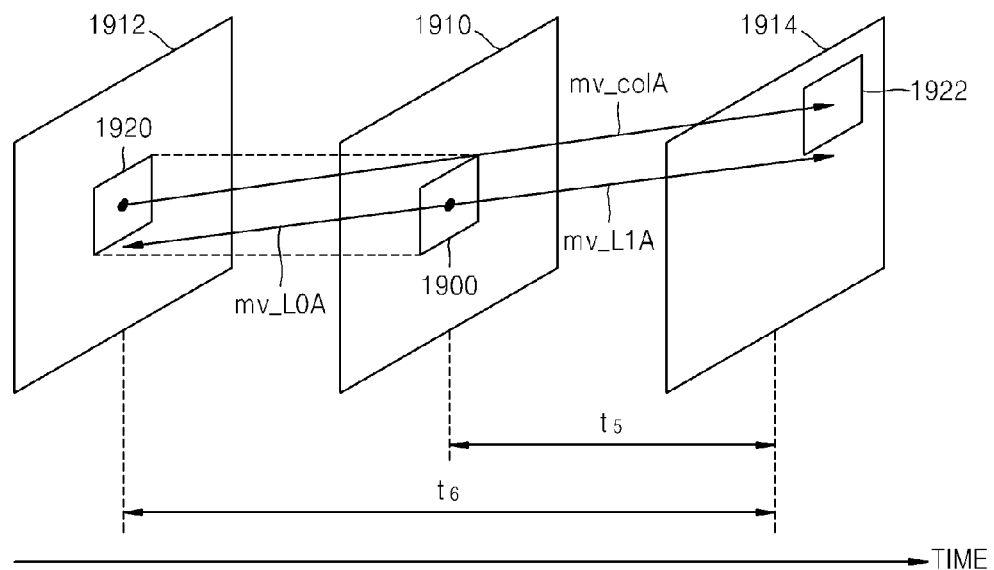
FIGS. 19A through 19C are reference diagrams for describing generation of motion vector predictor candidates, according to exemplary embodiments.
Figure 19B:
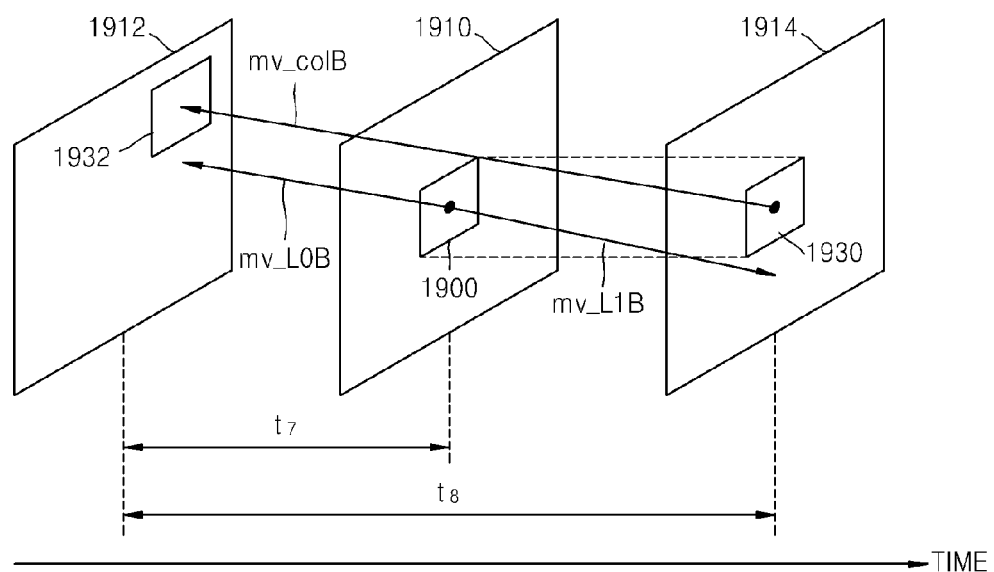
Figure 19C:
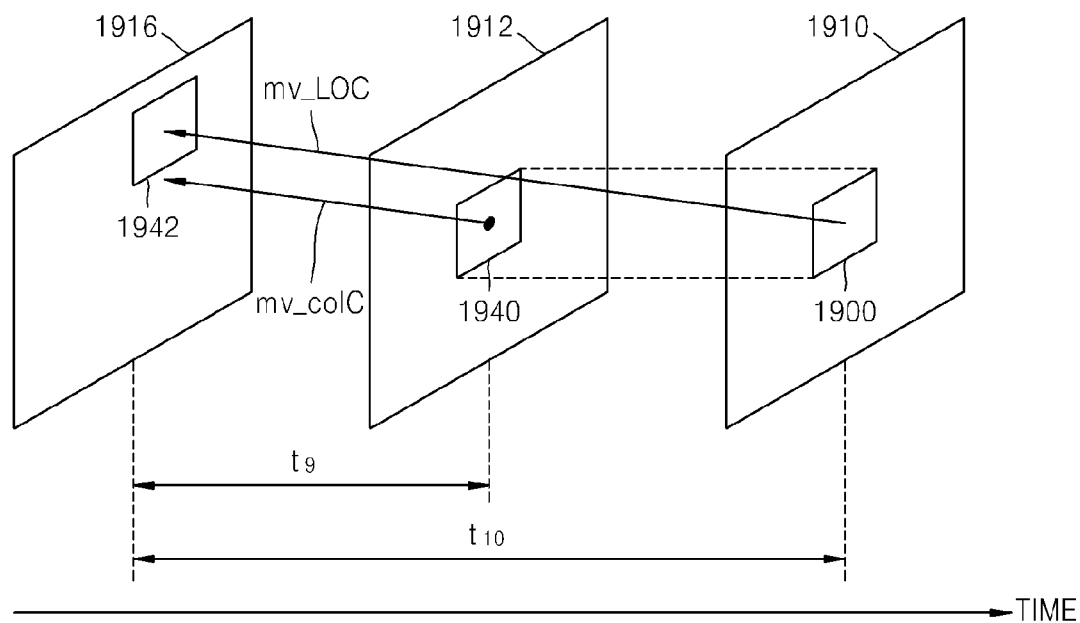

FIGS. 19A through 19C are reference diagrams for describing generation of the motion vector predictor candidates, according to exemplary embodiments.

FIG. 19A is a diagram for describing a method of calculating a motion vector predictor of a bi-directional predictive picture (B picture), according to an exemplary embodiment. In the B picture, where a current picture 1910 including a current block 1900 performs bi-directional prediction, a motion vector generated based on a temporal distance may be a motion vector predictor candidate.

A motion vector predictor mv_temporal of the current block 1900 of the current picture 1910 may be generated by using a motion vector of a co-located block 1920 of a temporally previous picture 1912. For example, when a motion vector mv_colA of the co-located block 1920 is generated with respect to a block 1922 of a temporally following picture 1914 of the current picture 1910, a temporal distance t5 between the current picture 1900 and picture 19140, and a temporal distance t6 between pictures 1912 and 1914, motion vector predictor candidates mv_L0A and mv_L1A of the current block 1900 may be generated as follows:

$$mv\_L1A=(t5/t6) \times mv\_colA$$

$$mv\_L0A=mv\_L1A-mv\_colA$$

Here, mv_L0A denotes a motion vector predictor of the current block 1900 with respect to the temporally previous picture 1912, and mv_L1A denotes a motion vector predictor of the current block 1900 with respect to the temporally following picture 1914.

In FIG. 19A, the current picture 1910 constituting the B picture exists between the temporally previous picture 1912 and the temporally following picture 1914. Here, when the motion vector mv_colA of the co-located block 1920 is generated with respect to the temporally following picture 1914, the motion vector of the current block 1900 may be more accurately predicted based on the motion vector predictor mv_L1A. In other words, the motion vector of the current block 1900 may be more accurately predicted when the motion vector mv_colA is in a direction shown in FIG. 19A than when the motion vector mv_colA is in an opposite direction from the direction shown in FIG. 19A, i.e., when the motion vector mv_colA is generated with respect to another picture before the temporally previous picture 1912.

Accordingly, when a direction from the current block 1900 to the co-located block 1920 is a List0 direction, the motion vector mv_colA of the co-located block 1920 should be in a List1 direction so that the current picture 1910 exists between the temporally previous picture 1912 and the temporally following picture 1914 as shown in FIG. 19A, thereby accurately predicting the motion vector of the current block 1900 based on the motion vector mv_colA.

Also, since the current picture 1910, the temporally previous picture 1912, and the temporally following picture 1914 of FIG. 19A are arranged in a time order, the motion vector predictor mv_temporal of the current block 1900 may be generated based on a POC. Since a picture referred to by the current block 1900 may not be one of the current picture 1910, the temporally previous picture 1912, and the temporally following picture 1914, the motion vector predictor mv_temporal of the current block 1900 is generated based on the POC.

For example, when CurrPOC denotes a POC of a current picture and CurrRefPOC denotes a POC of a picture referred to by the current picture, a motion vector predictor of a current block may be generated as follows:

$$Scale=(CurrPOC-CurrRefPOC)/(ColPOC-ColRefPOC)$$

$$mv\_temporal=Scale \times mv\_colA$$

Here, ColPOC denotes a POC of the temporally previous picture 1912 included in the co-located block 1920, and ColRefPOC denotes a POC of the temporally following picture including the block 1922 referred to by the co-located block 1920.

FIG. 19B is a diagram for describing a method of generating a motion vector predictor of a B picture, according to another exemplary embodiment. Comparing the method of FIG. 19A and the method of FIG. 19B, the temporally following picture 1914 includes a block 1930 in the same location as the current block 1900 of the current picture 1910.

Referring to FIG. 19B, the motion vector predictor of the current block 1900 of the current picture 1910 may be generated by using a motion vector of a co-located block 1930 of the temporally following picture 1914. For example, when a motion vector mv_colB of the co-located block 1930 is generated with respect to a block 1932 of the temporally previous picture 1912, a temporal distance t7 between the current picture 1910 and the picture 1912, and a temporal distance t8 between the pictures 1912 and 1914, motion vector predictor candidates mv_L0B and mv_L1B of the current block 1900 may be generated as follows:

$$mv\_L0B=(t7/t8) \times mv\_colB$$

$$mv\_L1B=mv\_L0B-mv\_colB$$

Here, mv_L0B denotes the motion vector predictor of the current picture 1910 with respect to the temporally previous picture 1912, and mv_L1B denotes the motion vector predictor of the current block 1900 with respect to the temporally following picture 1914.

Like FIG. 19A, the current picture 1910 constituting the B picture exists between the temporally previous picture 1912 and the temporally following picture 1914 in FIG. 19B. Accordingly, when the motion vector mv_colB of the co-located block 1930 is generated with respect to the temporally previous picture 1912, the motion vector of the current block 1900 may be more accurately predicted based on the motion vector mv_L0B. In other words, the motion vector of the current block 1900 may be more accurately predicted when the motion vector mv_colB is in a direction shown in FIG. 19B than when the motion vector mv_colB is in an opposite direction from the direction shown in FIG. 19B, i.e., when the motion vector mv_colB is generated with respect to another picture after the temporally following picture 1914.

Accordingly, when a direction from the current block 1900 to the co-located block 1930 is a List1 direction, the motion vector mv_colB of the co-located block 1930 should be in a List0 direction so that the current picture 1910 exists between the temporally previous picture 1912 and the temporally following picture 1914 as shown in FIG. 19B, thereby accurately predicting the motion vector of the current block 1900 based on the motion vector mv_colB.

Also, since a picture referred to by the current block 1900 may not be one of the temporally previous picture 1912 and the temporally following picture 1914, the motion vector predictor of the current block 1900 is generated based on the POC. For example, when CurrPOC denotes a POC of a current picture and CurrRefPOC denotes a POC of a picture referred to by the current picture, a motion vector predictor of a current block may be generated as follows:

Scale=(CurrPOC−CurrRefPOC)/(ColPOC−ColRefPOC)

mv_temporal=Scale*mv_colB

Here, ColPOC denotes a POC of the temporally following picture 1914 including the co-located block 1930, and ColRefPOC denotes a POC of the temporally previous picture 1912 including the block 1932 referred to by the co-located block 1930.

The motion vector encoder 1420 may use any one of the methods of FIGS. 19A and 19B while generating the motion vector predictor of the current block 1900 of the B picture. In other words, since the motion vector encoder 1420 generates the motion vector predictor by using the motion vector and the temporal distance of the co-located block 1920 or 1930, the motion vector predictor is generated by using one of the methods of FIGS. 19A and 19B only when the motion vector of the co-located block 1920 or 1930 exists. Accordingly, the motion vector encoder 1420 generates the motion vector predictor of the current block 1900 by only using a block having a motion vector from among the co-located blocks 1920 and 1930.

For example, when the co-located block 1920 of the temporally previous picture 1912 is encoded by using intra prediction, instead of inter prediction, the motion vector of the co-located block 1920 does not exist, and thus the motion vector predictor of the current block 1900 cannot be generated by using the method of FIG. 19A.

When the motion vector encoder 1420 generates the motion vector predictor of the current block 1900 of the B picture as shown in FIGS. 19A and 19B, both of the co-located block 1920 of the temporally previous picture 1912 and the co-located block 1930 of the temporally following picture 1914 may be used. Accordingly, a decoder for decoding a motion vector must determine which block is used to generate the motion vector predictor from among the co-located blocks 1920 and 1930, to decode the motion vector predictor.

Accordingly, the motion vector encoder 1420 may encode information for specifying which block is used, and insert the encoded information into a block header or a slice header.

FIG. 19C is a diagram for describing a method of generating a motion vector predictor of a predictive picture (P picture), according to an exemplary embodiment.

Referring to FIG. 19C, the motion vector predictor of the current block 1900 of the current picture 1910 may be generated by using a motion vector of a co-located block 1940 of the temporally previous picture 1912. For example, when a motion vector mv_colC of the co-located block 1940 is generated with respect to a block 1942 of another temporally previous picture 1916, a temporal distance t9 between the pictures 1912 and 1916, and a temporal distance t10 between the pictures 1910 and 1916, a motion vector predictor mv_LOC of the current block 1900 may be generated as follows:

mv_LOC=(t10/t9)×mv_colC

The motion vector mv_LOC may be generated based on a POC as described above with reference to FIGS. 19A and 19B. The motion vector mv_LOC may be generated based on a POC of the current picture 1910, a POC of a picture referred to by the current picture 1910, a POC of the temporally previous picture 1912, or a POC of the other temporally previous picture 1916.

Since the current picture 1910 is a P picture, only one motion vector predictor candidate of the current block 1900 is generated in FIG. 19C, unlike FIGS. 19A and 19B.

In summary, a group C of motion vector predictor candidates generated by the motion vector encoder 1420 may be as follows.

C={median(mv_a', mv_b', mv_c'), mv_a', mv_b', mv_c', mv_temporal}

Here, as described above with reference to FIGS. 16 through 18, mv_a' denotes a first motion vector predictor constituting a motion vector of an adjacent block initially effective from a left block of a current block, mv_b' denotes a second motion vector predictor constituting a motion vector of an adjacent block initially effective from an upper block of the current block, and mv_c' denotes a third motion vector predictor constituting a motion vector of an adjacent block effective from blocks located at corners of the current block. Here, regarding effectiveness of an adjacent block, i) whether an adjacent block refers to a first reference picture referred to by a current block, ii) whether an adjacent block refers to a reference picture other than the first reference picture, which exists in the same list direction as the first reference picture, and iii) whether an adjacent block refers to a reference picture existing in a different list direction from the first reference picture are sequentially determined, and a motion vector of an initially scanned adjacent block that satisfies the above condition is determined as a motion vector predictor candidate. Also, median( ) denotes a median and mv_temporal denotes motion vector predictor candidates generated by using the temporal distance described above with reference to FIGS. 19A through 19C. As described above, the motion vector encoder 1420 may calculate a median by only using motion vectors in the same type while determining medians of motion vectors of adjacent blocks as motion vector predictor candidates. In other words, the motion vector encoder 1420 may determine the first through third motion vector predictors by only using motion vectors referring to the first reference picture from among the motion vectors of the adjacent blocks of the current block, and include medians of the first through third motion vector predictors in the motion vector predictor candidates of the current block. Alternatively, as described above, the motion vector encoder 1420 may determine the first through third motion vector predictors by using the motion vector of the adjacent block referring to the reference picture in the same list direction as the first reference picture or the motion vector of the adjacent block referring to the reference picture in the different list direction from the first reference picture, and include the medians of the first through third motion vector predictors in the motion vector predictor candidates of the current block. Here, the motion vector encoder 1420 may include the medians of the first through third motion vector predictors in the motion vector predictor candidates only when all of the first through third motion vector predictors refer to the reference picture other than the first reference picture.

The motion vector encoder 1420 may add information about which motion vector predictor from among elements of the group C of motion vector predictor candidates is used to a bitstream, as information about a motion vector predictor. In detail, in order to specify one element in the group C, the motion vector encoder 1420 may assign an index to each motion vector predictor candidate, and add index information of a motion vector predictor actually used to encode a motion vector to a bitstream.

Also, when the group C is generated, the motion vector encoder 1420 may prioritize useable motion vector predictors to use the usable motion vector predictors according to priority while encoding the motion vector. For example, the motion vector encoder 1420 prioritizes median(mv_a', mv_b', mv_c'), mv_a', mv_b', mv_c', and mv_temporal in the stated order to determine a motion vector predictor to be used to encode the motion vector.

The skilled artisan will understand that motion vector predictor candidates other than the above-described motion vector predictor candidates may be used.

Alternatively, the motion vector encoder 1420 may classify the adjacent blocks into the N (N is integer) adjacent groups and determine N motion vector predictors for respective N adjacent groups by using the motion vector of the adjacent block referring to another reference picture in the same list direction as the first reference picture, or the motion vector of the adjacent block referring to another reference picture in the different list direction from the first reference picture, and include the medians of the third through third motion vector predictors in the motion vector predictor candidates of the current block. For example, referring back to FIG. 15B, the motion vector encoder 1420 may group the adjacent blocks into two groups. Here, one group includes a0 through $a_n$ block 1510 adjacent to the top of the current block and upper right c block 1531. Another group includes b0 through $b_n$ block 1520 adjacent to the left of the current block and a lower left e block 1532. After grouping the adjacent blocks of the current block into two groups, the motion vector encoder 1420 determine two motion vector predictors for respective two groups, as described above. Also, the motion vector encoder 1420 may classify the adjacent blocks into the N adjacent groups according to the location of the adjacent blocks and determine N motion vector predictors for respective N adjacent groups.

Meanwhile, the motion vector encoder 1420 may only encode information indicating that the motion vector predictor of the current block is encoded based on a block or pixel included in an adjacent region encoded before the current block. In other words, the motion vector encoder 1420 may not encode the information for specifying the motion vector predictor, and may encode only the information indicating that the motion vector predictor is generated. Generally, in Codec, such as MPEG-4 H.264 or MPEG-4 AVC, motion vectors of adjacent blocks encoded before a current block are used to predict a motion vector of the current block. When medians of motion vectors of previously encoded adjacent blocks located at the left, top, and upper right of the current block are determined to be used as the motion vector predictors of the current block, information for selecting one of the motion vector predictor candidates may not be separately encoded.

In other words, when information indicating that the motion vector predictor of the current block is encoded in an implicit mode is encoded during an encoding process, the medians of the motion vectors of the adjacent blocks at the left, top, and upper right of the current block may be used as the motion vector predictors of the current block during a decoding process. Specifically, a method and apparatus for encoding a motion vector, according to another exemplary embodiment, may generate a motion vector predictor by using adjacent pixel values encoded before a current block as templates. This will be described in detail with reference to FIG. 20.

Figure 20:
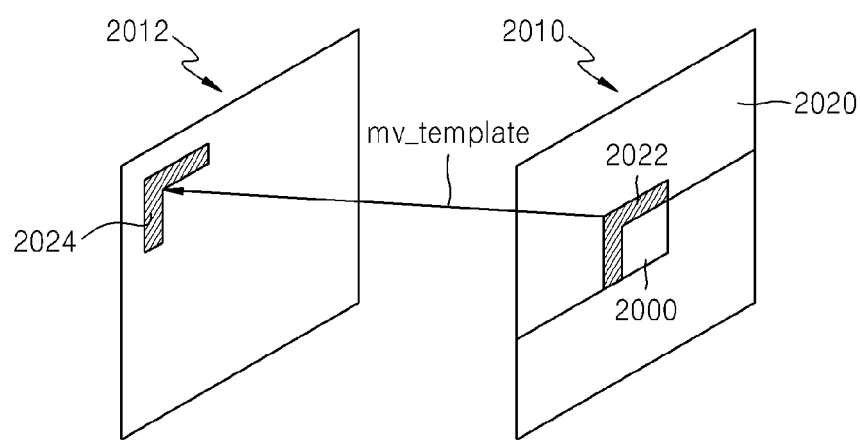
FIG. 20 is a diagram for describing a method of generating a motion vector predictor in an implicit mode, according to an exemplary embodiment.

FIG. 20 is a diagram for describing a method of generating a motion vector predictor in an implicit mode, according to an exemplary embodiment.

Referring to FIG. 20, a motion vector predictor of a current block 2000 of a current picture 2010 is generated by using pixels 2022 included in an adjacent region 2020 encoded before the current block 2000. Pixels 2024 corresponding to the pixels 2022 are determined by searching a reference picture 2012 by using the pixels 2022. The pixels 2024 may be determined by calculating a cost, such as a sum of absolute difference (SAD). When the pixels 2024 are determined, motion vectors mv_template of the pixels 2022 are determined, and the motion vectors mv_template may be used as motion vector predictors of the current block 2000. When the motion vectors mv_template are searched for in the reference picture 2012, the group C of the motion vector predictor candidates described above may be used.

Figure 21:
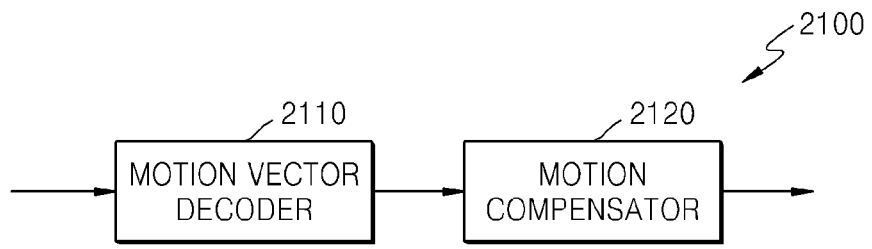
FIG. 21 is a block diagram of an apparatus for decoding a motion vector, according to an exemplary embodiment.

FIG. 21 is a block diagram of an apparatus 2100 for decoding a motion vector, according to an exemplary embodiment.

The apparatus 2100 of FIG. 21 includes elements related to encoding of a motion vector, such as the motion compensator 560 and the entropy decoder 520 of FIG. 5, wherein the entropy decoder 520 of FIG. 5 may perform operations performed by a motion vector decoder 2110 of FIG. 21.

Referring to FIG. 21, the apparatus 2100 includes the motion vector decoder 2110 and a motion compensator 2120.

The motion vector decoder 2110 decodes information about a motion vector predictor of a current block that is decoded from a bistream, and a difference between a motion vector of the current block and the motion vector predictor of the current block. In detail, the motion vector decoder 2110 decodes index information indicating a motion vector predictor from among motion vector predictor candidates described above, which is used as a motion vector predictor of the current block to be decoded. If the motion vector predictor candidates include mv_temporal described above with reference to FIGS. 19A through 19C, information about whether a co-located block used to generate mv_temporal is a block of a temporally previous picture or a temporally following picture of the current picture is also decoded. If a motion vector predictor of a current block is encoded in an implicit mode as shown in FIG. 20, mode information indicating the implicit mode is decoded.

The motion compensator 2120 generates the motion vector predictor of the current block based on the information about the motion vector predictor of the current block. In other words, the motion compensator 2120 determines which motion vector predictor is used as the motion vector predictor of the current block from the information about the motion vector predictor, and restores a motion vector of the current block by adding the determined motion vector predictor and a decoded difference. In the motion vector predictor encoded as described above with reference to FIGS. 16 through 18, when a block having a motion vector referring to the first reference picture like the current block does not exist from among adjacent blocks, the motion vector predictor may be determined by using a motion vector of an adjacent block referring to a reference picture other than the first reference picture.

Figure 22:
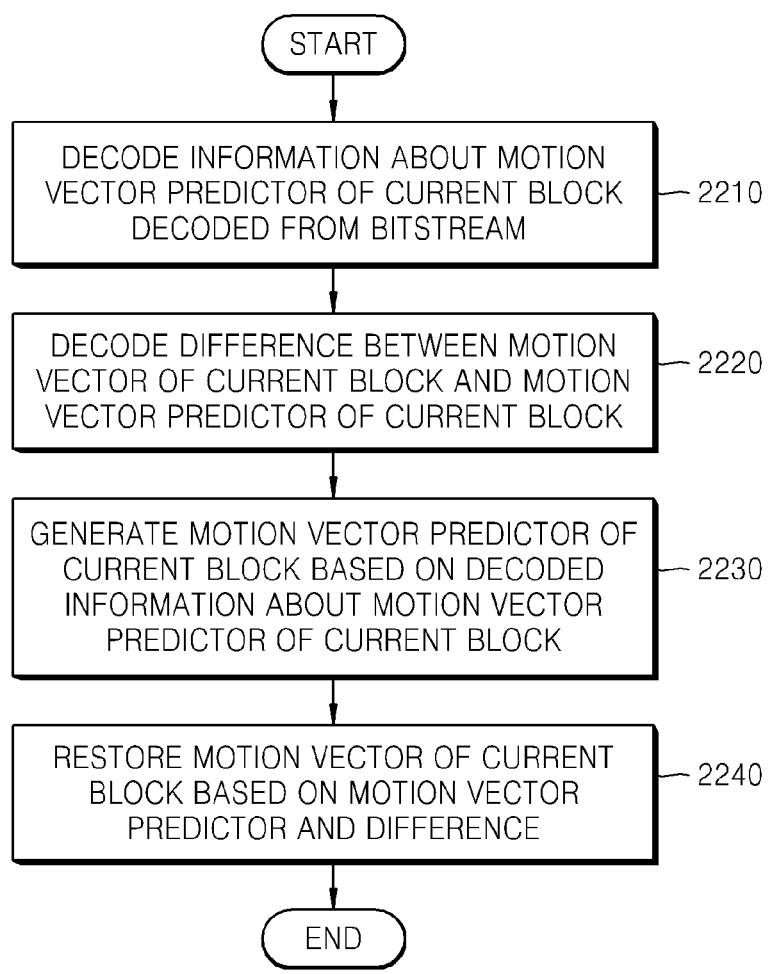
FIG. 22 is a flowchart illustrating a method of decoding a motion vector, according to an exemplary embodiment.

FIG. 22 is a flowchart illustrating a method of decoding a motion vector, according to an exemplary embodiment.

Referring to FIG. 22, the motion vector decoder 2110 decodes information about a motion vector predictor of a current block decoded from a bitstream, and decodes a difference between a motion vector of the current block and the motion vector predictor of the current block respectively in operations 2210 and 2220. As described above, the motion vector decoder 2110 decodes index information indicating a motion vector predictor from among motion vector predictor candidates, which is used as a motion vector predictor of the current block to be decoded. If the motion vector predictor candidates include mv_temporal described above with reference to FIGS. 19A through 19C, information about whether a co-located block used to generate mv_temporal is a block of a temporally previous picture or a temporally following picture of the current picture is also decoded. If a motion vector predictor of a current block is encoded in an implicit mode as shown in FIG. 20, mode information indicating the implicit mode is decoded.

The motion compensator 2120 generates the motion vector predictor of the current block based on the information about the motion vector predictor in operation 2230, and restores the motion vector of the current block by adding the motion vector predictor and the difference. As described above, in the motion vector predictor encoded as described above with reference to FIGS. 16 through 18, when a block having a motion vector referring to the first reference picture like the current block does not exist from among adjacent blocks, the motion vector predictor may be determined by using a motion vector of an adjacent block referring to a reference picture other than the first reference picture.

The exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Alternatively, the exemplary embodiments may be embodied as computer-readable transmission media, such as carrier waves, for transmission over a network, such as the Internet.

The apparatuses, encoders, and decoders of the exemplary embodiments may include a bus coupled to every unit of the apparatus, at least one processor (e.g., central processing unit, microprocessor, etc.) that is connected to the bus for controlling the operations of the apparatuses to implement the above-described functions and executing commands, and a memory connected to the bus to store the commands, received messages, and generated messages.

While aspects of the application have been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description, but by the appended claims, and all differences within the scope will be construed as being included in the present invention.

What is claimed is:

1. An apparatus of decoding an image, the apparatus comprising:
   an information extractor which obtains a prediction mode of a current block and motion vector predictor information with respect to a motion vector predictor of the current block from a bitstream; and
   an image data decoder which, when the prediction mode of the current block is inter-prediction, obtains motion vector predictor candidates of the current block using at least one motion vector of neighboring blocks adjacent to the current block, obtains a motion vector predictor of the current block from among the motion vector predictor candidates based on a motion vector predictor information obtained from the bitstream, and restores a motion vector of the current block based on the motion vector predictor and a difference motion vector,
   wherein the motion vector predictor candidates are obtained by searching for an available motion vector from the neighboring blocks adjacent to a left side of the current block according to a first order, and by searching for an available motion vector from the neighboring blocks adjacent to an upper side of the current block according to a second order, and
   wherein the neighboring blocks adjacent to the left side of the current block comprise a lower left block and an upper block located on the upper side of the lower left block.

* * * * *